United States Patent
Lawson et al.

(10) Patent No.: US 9,455,643 B2
(45) Date of Patent: Sep. 27, 2016

(54) AC INPUT POWER CONVERTER WITH MULTI-FUNCTIONAL INDUCTOR

(71) Applicant: CogniPower, LLC, Malvern, PA (US)

(72) Inventors: Thomas E. Lawson, Malvern, PA (US); William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 0 days.

(21) Appl. No.: 14/711,869

(22) Filed: May 14, 2015

(65) Prior Publication Data

US 2015/0244283 A1    Aug. 27, 2015

Related U.S. Application Data

(63) Continuation-in-part of application No. 14/347,722, filed as application No. PCT/US2012/064617 on Nov. 12, 2012, now Pat. No. 9,036,376.

(60) Provisional application No. 62/029,663, filed on Jul. 28, 2014, provisional application No. 61/559,397, filed on Nov. 14, 2011.

(51) Int. Cl.
  *H02M 3/335*    (2006.01)
  *H02M 7/04*    (2006.01)
  (Continued)

(52) U.S. Cl.
  CPC .............. *H02M 7/04* (2013.01); *H02J 3/32* (2013.01); *H02M 1/4208* (2013.01); *H02M 3/1584* (2013.01); *H02M 2003/1566* (2013.01)

(58) Field of Classification Search
  CPC ............................................. H02M 2001/0003
  USPC ............................ 363/21.04–21.12, 123–129
  See application file for complete search history.

(56) References Cited

U.S. PATENT DOCUMENTS 6,115,267 A      9/2000  Herbert
6,462,963 B1 *  10/2002  Wittenbreder .......... H02M 1/34
                                                                363/127

(Continued)

FOREIGN PATENT DOCUMENTS

WO    WO2008009025 A2    1/2008
WO    WO2013074433 A2    5/2013

OTHER PUBLICATIONS

International Search Report and Written Opinion; Mailed Oct. 17, 2013 for the corresponding PCT Application No. PCT/US2012/064617.

(Continued)

*Primary Examiner* — Adolf Berhane
*Assistant Examiner* — Nusrat Quddus
(74) *Attorney, Agent, or Firm* — Mendelsohn Dunleavy, P.C.; Steve Mendelsohn

(57) ABSTRACT

In certain embodiments, a power converter has an input side connected to receive AC input power at an input node and an output side connected to produce a regulated output power at an output node. The power converter has a transformer having at least one primary winding on the input side and at least one secondary winding on the output side. The power converter has at least one multi-functional inductor that supports both main regulation and supplemental regulation in a time-multiplexed manner such that, during main regulation, input energy is transferred from the input node to the output node via the multi-functional inductor, and, during supplemental regulation, the stored energy is transferred from the at least one energy storage element to the output node via the multi-functional inductor. Depending on the embodiment, the multi-functional inductor(s) may be one or two secondary transformer windings or a separate buck inductor.

35 Claims, 27 Drawing Sheets

(51) Int. Cl.
*H02J 3/32* (2006.01)
*H02M 3/158* (2006.01)
*H02M 1/42* (2007.01)
*H02M 3/156* (2006.01)

(56) References Cited

U.S. PATENT DOCUMENTS

| | | |
|---|---|---|
| 6,504,497 B2 | 1/2003 | Jang et al. |
| 6,545,883 B2 | 4/2003 | Xing et al. |
| 7,061,212 B2 | 6/2006 | Phadke |
| 7,436,159 B1 | 10/2008 | Wochele |
| 7,642,758 B2 | 1/2010 | Morong et al. |
| 7,965,064 B2 | 6/2011 | Morong et al. |
| 7,978,483 B2 | 7/2011 | Mazzola et al. |
| 8,344,638 B2 | 1/2013 | Shteynberg et al. |
| 8,467,199 B2 | 6/2013 | Lee et al. |
| 8,570,008 B2 | 10/2013 | Lawson et al. |
| 8,665,613 B2 | 3/2014 | Degen et al. |
| 2010/0014330 A1 | 1/2010 | Chang et al. |
| 2010/0039080 A1 | 2/2010 | Schoenbauer et al. |
| 2010/0265628 A1 | 10/2010 | Blinder et al. |

OTHER PUBLICATIONS

Non-Final Office Action; Mailed Nov. 17, 2014 for the corresponding U.S. Appl. No. 14/347,722.

Final Office Action; Mailed Dec. 24, 2014 for the corresponding U.S. Appl. No. 14/347,722.

Notice of Allowance and Fee(s) Due; Mailed Mar. 17, 2015 for the corresponding U.S. Appl. No. 14/347,722.

International Search Report and Written Opinion; Mailed Nov. 4, 2015 for the corresponding PCT Application No. PCT/US2015/041681.

\* cited by examiner

AC INPUT POWER CONVERTER WITH MULTI-FUNCTIONAL INDUCTOR

This application claims the benefit of the filing date of U.S. provisional application No. 62/029,663, filed on Jul. 28, 2014, the teachings of which are incorporated herein by reference in their entirety.

This is a continuation-in-part of co-pending application Ser. No. 14/347,722 ("the '722 application"), filed on Mar. 27, 2014, which claims the benefit of the filing dates of U.S. provisional application No. 61/559,397, filed on Nov. 14, 2011, and PCT application no. PCT/US12/64617, filed on Nov. 12, 2012, the teachings of all three of which are incorporated herein by reference in their entirety.

BACKGROUND

1. Field of the Invention

The present invention is related to electronics and, in particular, to AC/DC and AC/AC conversion.

2. Description of the Related Art

AC powered converters increasingly require Power Factor Correction (PFC) for system efficiency and to conform to mandates. Power converters generally require an extra stage of power conversion to achieve near-unity Power Factor. There is a need for simple, efficient AC input power converters with near-ideal Power Factor that can replace physically larger and more costly two-stage converters.

DETAILED DESCRIPTION

Figure 1:
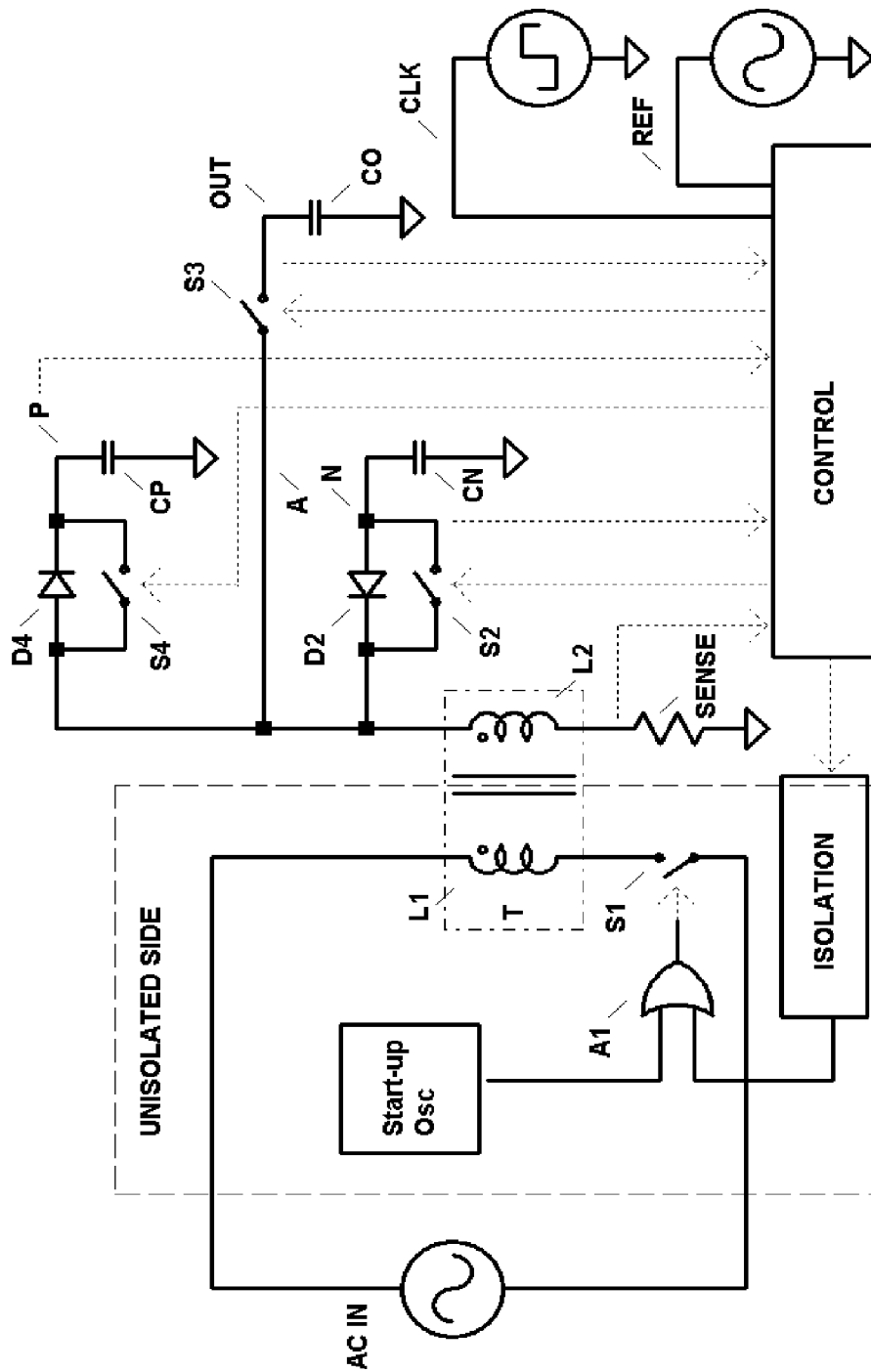
FIG. 1 shows a schematic block diagram of a transformer with primary and secondary winding, combined with 4 switches, 2 of which are bipolar-blocking, to form a bipolar, bidirectional amplifier/power converter with PFC.

Glossary unipolar: Exclusively positive or exclusively negative.

bipolar output: An output that can operate in both the positive and negative quadrants.

bidirectional regulation: Regulation that can move energy to or take energy from an output.

bipolar blocking switch: A switch that can block the flow of current, regardless of the polarity of the voltage across the switch.

Power Factor Correction (PFC): Control which causes input current to be drawn in proportion to input voltage.

storage reservoir or storage element: A capacitor, super capacitor, or rechargeable battery or other reversible medium for storing energy.

main regulation: Regulation provided by moving energy from an input to an output.

supplemental regulation: Regulation provided by moving energy from a storage reservoir to an output.

time-multiplexed: Using the same element or structure in different ways at different times.

Predictive Energy Balancing (PEB): A control technique that is taught in U.S. Pat. Nos. 7,642,758, 7,965,064, and 8,570,008, the teachings of which are incorporated herein by reference, and in various articles in the trade press.

forward transfer: The movement of energy from input to output.

reverse transfer: The movement of energy from output to a storage reservoir.

flyback transfer: The voltage-inverting movement of energy into and out of an inductor.

Forward transfer: An energy transfer via a transformer where current flows in both the unisolated winding and the isolated winding at the same time.

An approach to efficient PFC is shown in the '722 application. That approach focuses on topologies where a separate supplemental regulator moves energy from a storage reservoir to the output during periods when insufficient energy to support the output is immediately available from the AC line. One focus of the present invention is on blending the main and supplemental regulators into the same, single-stage structure. These converters use the same inductor or transformer winding(s) for both the main and supplemental power paths. In the '722 application, the supplemental converter was a distinct circuit block. In this specification, the supplemental path is blended with the elements of the main regulator.

Most of the examples here use constant ON time to achieve PFC. As used in this specification, the term Power Factor Correction or PFC implies that the power converter draws input current in proportion to and in phase with input voltage. That ON time can be slowly modulated for regulation of total stored energy. Alternatively, the frequency of operation can be slowly varied for the same purpose. In cases where the energy transferred is not in proportion to a volt-time product, the ON time may be mathematically adjusted to achieve better PFC, or the energy transferred can be measured by one of a variety of methods known to those familiar with the art. In all cases, a portion of the power moves directly from the input to the output, and another portion of the power moves into and/or out of storage. All three power movements (i.e., input to output, input to storage, and storage to output) are single-stage power conversions, and all are subject to individual control, either directly or indirectly.

In at least one embodiment, the invention provides a single-stage, AC input power converter with near-ideal Power Factor and high efficiency. High efficiency is achieved by allowing a portion of the total power to move through only a single stage of power conversion. Power Factor Correction is achieved through actively managed energy storage. Economy and small size are achieved by using the same circuit elements that provide power to the output to regulate the input current and to manage the movement of energy into and out of storage.

A form of bidirectional, bipolar output, AC input power converter is shown in FIG. 1. Any AC input frequency is suitable, up to about ⅕₀th of the frequency of the control cycle clock, CK. An oscillator, Start-up Osc, runs initially to activate switch S1 through OR gate A1 to pump energy from input, AC IN, through transformer, T, into storage capacitors, CN & CP. Once the control block, CONTROL, is sufficiently powered by voltages N and/or P, CONTROL takes over the operation of S1, via wireless (i.e., non-ohmic) communication through isolation block, ISOLATION, and through OR gate A1. Isolation block, ISOLATION, can be one of many forms of digital isolator, including commercially available digital isolators or a pulse transformer. A small toroid core with as little as a single turn for primary and secondary windings can serve the purpose.

The output, OUT, filtered by capacitor CO, is regulated to match the reference, REF, by the following process, or its equivalent.

Each control cycle, as clocked by CLK, is divided into two halves. In the power converter of FIG. 1, the clock runs at 200 kHz. Any frequency above a few kHz would be suitable, though it is generally desirable to run at above 20 kHz to avoid audible noise. The maximum suitable clock frequency will be limited by the speed of the power switching elements employed. Each half of a control cycle typically includes (i) an energize phase, in which energy is stored in the transformer T from either the AC input, one of the storage capacitors CN and CP, or the output OUT, and (ii) a transfer phase, in which energy is transferred from the transformer T to either the output OUT or one of the storage capacitors CN and CP. Note that, as used in this specification, the term "half" does not necessarily mean that the control cycle is divided into two halves of equal duration.

During the first half-cycle, switch S1 is activated for a constant ON time, energizing transformer T primary winding L1 from input node AC IN. Energy is then available at secondary winding L2. If the inductive energy is in the correct polarity to service demand at the output, then that energy is provided through switch S3. Energy transfer continues until 1) the inductive energy is exhausted, as indicated by the voltage at the current sense resistor, SENSE, or 2) until the demand for regulation is met. In case 2, remaining inductive energy is transferred to storage element CN or CP, depending on its polarity. Switches S2 and S4 can be used for the purpose, or diodes D2 and D4 will perform that function without the intervention of control block CONTROL. The diodes are optional, given synchronous rectification, as follows. In particular, if the remaining inductive energy in the secondary winding L2 is positive (as determined by CONTROL detecting the voltage at SENSE), then CONTROL closes switch S4 to transfer the excess energy to storage element CP. Similarly, if the remaining inductive energy in the secondary winding L2 is negative, then CONTROL closes switch S2 to transfer the excess energy to storage element CN. If the magnitude of the voltage is sufficiently great, then energy will flow into the corresponding storage element CP or CN via diode D4 or D2, respectively.

The second half of the control cycle might begin with an energize period for transformer winding L2. If the output OUT is larger in magnitude than the reference REF, then the source of the energy is through S3. Energizing continues until the regulation point is reached. Inductive energy is then transferred to storage element CN or CP, depending on the polarity. Switches S2 and S4 can be used for the purpose, or diodes D2 and D4 will perform that function without the intervention of control block CONTROL.

If, at the start of the second half of the cycle, the output OUT must increase in magnitude in the positive direction in order to achieve regulation, then switch S2 is closed by CONTROL to energize L2 from storage CN. Energizing L2 through switch S2 is terminated by CONTROL (opening S2) by predictive energy balancing, or by a predetermined ON time, or by charging to a desired current. The inductive energy is then transferred from L2 to the output through switch S3. If the regulation point is reached before the inductive energy is exhausted, then switch S3 is opened causing remaining inductive energy to be transferred to storage reservoir CP. Switch S4 can be used for the purpose, or diode D4 will perform that function without the intervention of control block CONTROL.

If the output must increase in magnitude in the negative direction to achieve regulation, then switch S4 is closed by CONTROL to energize L2 from storage CP. Energizing through switch S4 is terminated by CONTROL (opening S4) by predictive energy balancing, or by a predetermined ON time, or by charging to a desired current. Then, inductive energy is transferred from L2 to the output through switch S3. If the regulation point is reached before the inductive energy is exhausted, then switch S3 is opened causing remaining inductive energy to be transferred to storage reservoir CN. Switch S2 can be used for the purpose, or diode D2 will perform that function without the intervention of control block CONTROL.

Each parallel combination of a switch and a diode here, and in subsequent figures, may be implemented with a conventional FET, which would include a body diode, or by using appropriate discrete elements.

The voltages at P and N may vary over a large range during normal operation. If one of those voltages diverges in magnitude beyond a predetermined point, then control block CONTROL can equalize the voltages P and N by energizing L2 to a higher level in the energize step above when energizing from the reservoir larger in magnitude. Then, after reaching regulation at the output, that additional energy is transferred to the reservoir of lesser magnitude.

Control block CONTROL also includes a slow, non-critical control loop which monitors the voltages at N and P. If the total amount of stored energy is too large, then the constant ON time is slightly reduced. If the total amount of stored energy is too small, then the constant ON time is slightly increased. These ON time changes are heavily filtered so as not to reduce the Power Factor by changing the ON time significantly during a single AC cycle.

Figure 2:
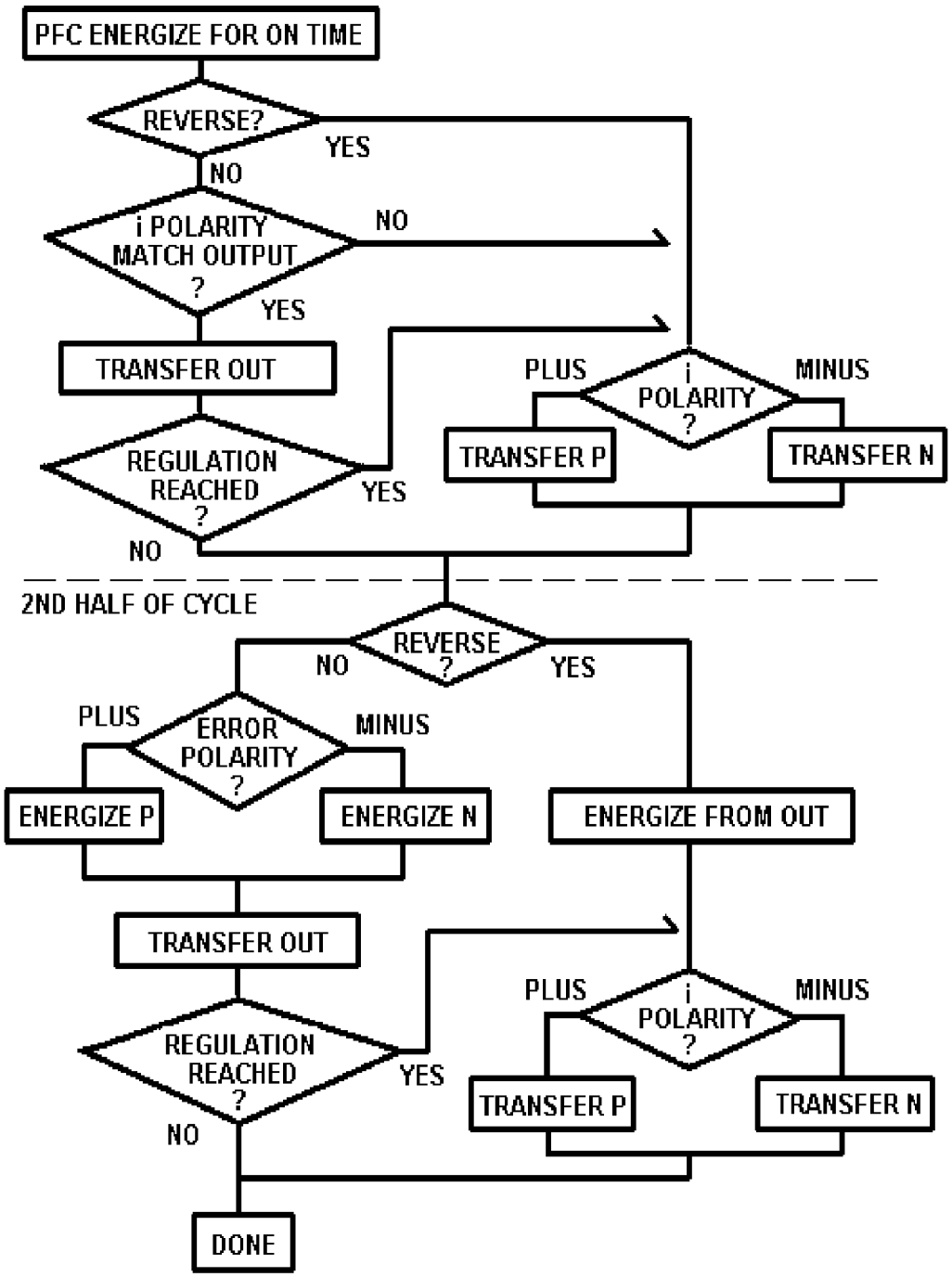
FIG. 2 shows a flow chart for control of the power converter of FIG. 1.

The operation above is shown in flowchart form in FIG. 2. That control can be implemented as a state machine, in programmable logic, in a microcontroller, or using discrete circuitry. Combinations of these methods have been verified through SPICE simulation, or through the use of actual analog and digital circuitry.

Figure 3:
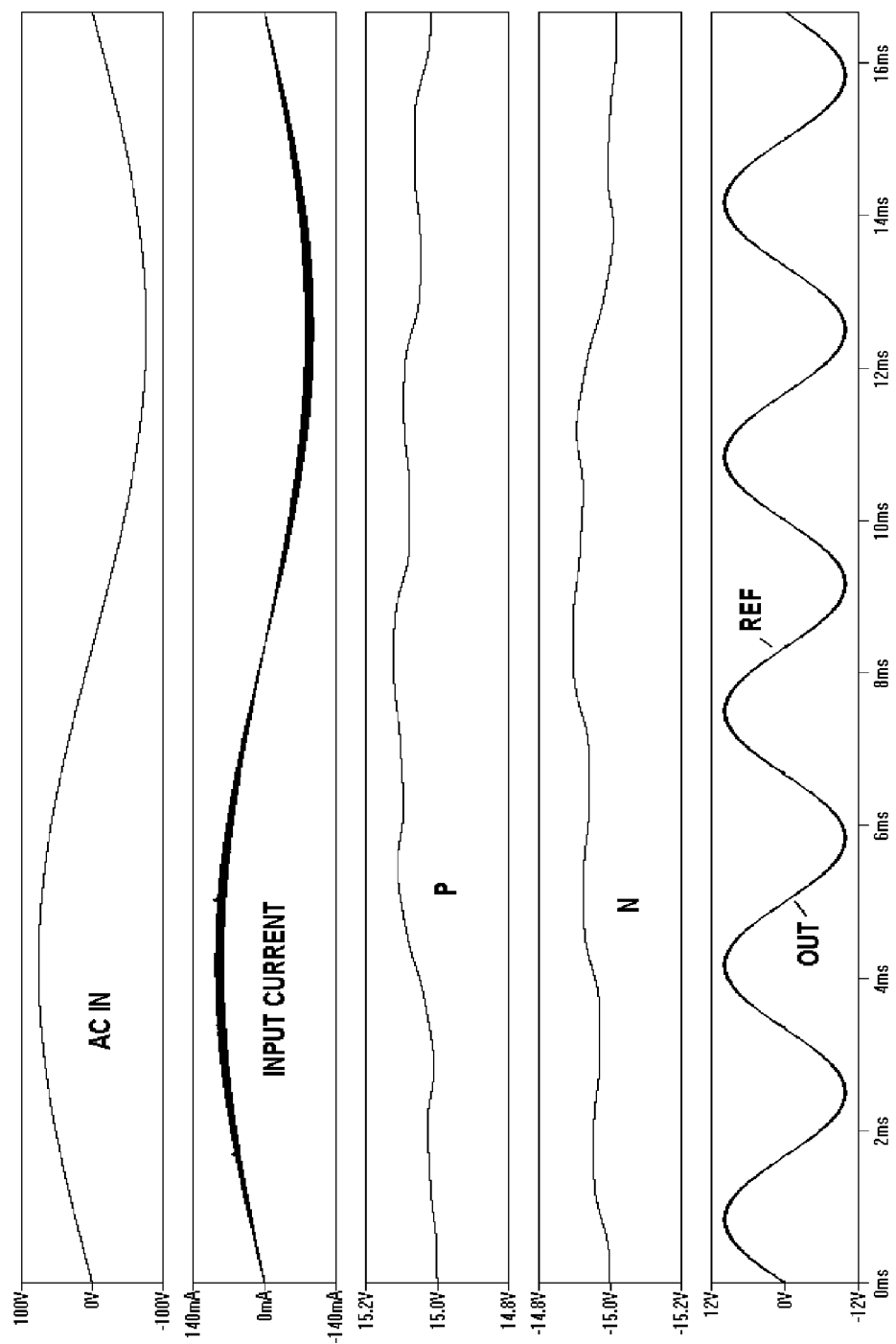
FIG. 3 shows simulated waveforms for the converter of FIG. 1 in operation.

FIG. 3 shows SPICE waveforms of the example of FIG. 1 in operation. The top trace shows one cycle of 60 Hz AC input voltage, AC IN. The second trace shows the input current, INPUT CURRENT, low-pass filtered to remove most of the switching frequency. Input current is also shown after that filtering in the waveforms that follow. The filtered input current can be seen to be proportional to, and in phase with, the AC input voltage. That is the desired input current waveform for ideal PFC. The third trace shows the positive storage voltage, P. Voltage P is seen to increase and decrease, modulated by both the AC input voltage and by the demand at the output. Over the one complete AC cycle shown, voltage P ends at near the level it begins. The fourth trace shows the negative storage voltage, N. Voltage N is seen to increase and decrease, modulated by both the AC input voltage and by the demand at the output. Over the one complete AC cycle shown, voltage N ends at near the level it begins. The fifth axis shows the reference voltage, REF, and the output voltage, OUT. The two traces superimpose so as to be largely indistinguishable.

Should the total stored energy climb above a preset limit, a separate slow loop would reduce the constant ON time. Should the total stored energy fall below a preset limit, the separate slow loop would increase the constant ON time. If P or N were to become larger than the other by more than a preset limit, then energy can be transferred from the reservoir larger in magnitude to the reservoir smaller in magnitude during forward transfers in the second half of a control cycle.

Figure 4:
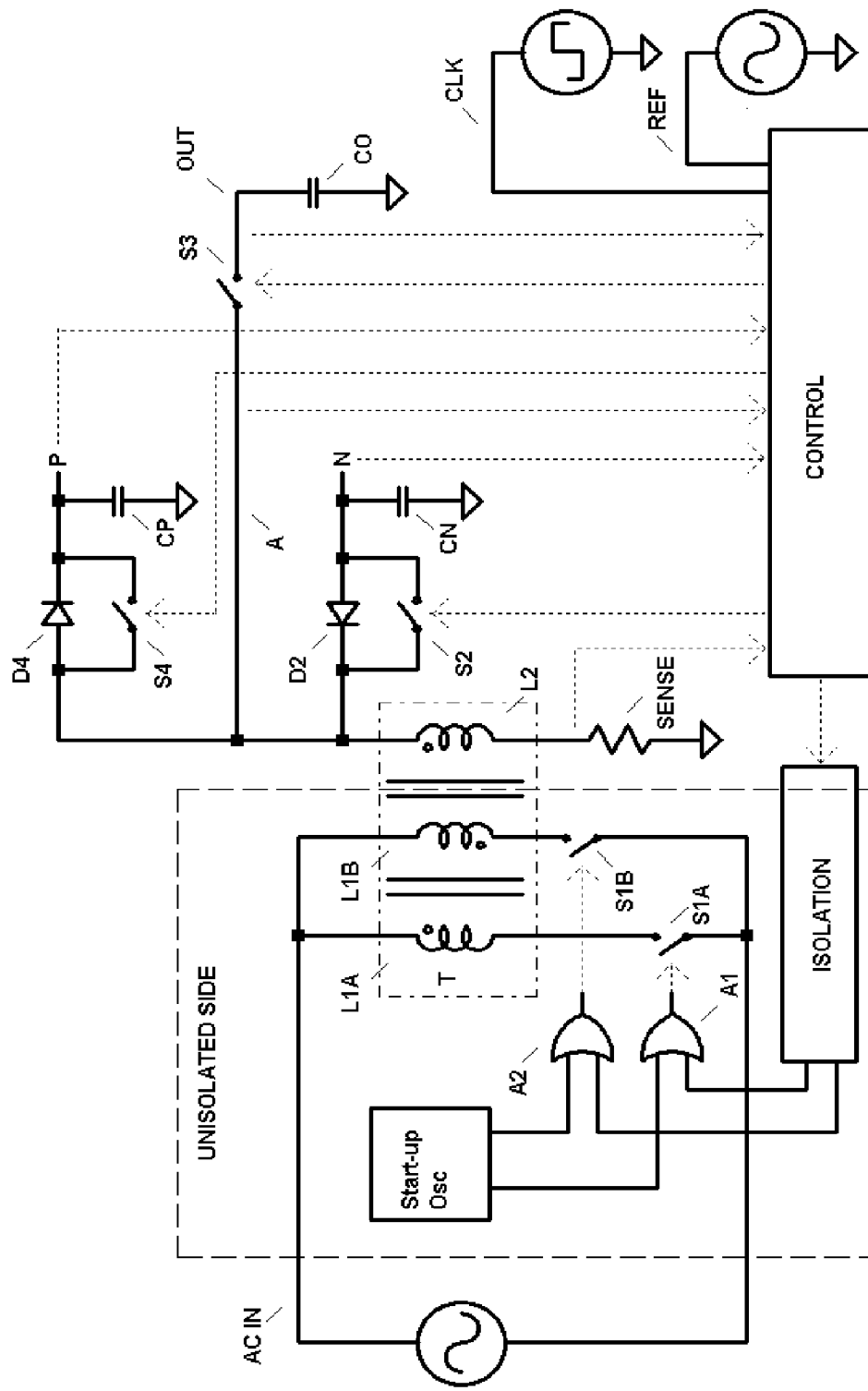
FIG. 4 shows a schematic block diagram of a dual primary, single secondary transformer in a topology with 5 switches, 3 of which are bipolar-blocking, to form a bipolar, bidirectional amplifier/power converter with PFC.

FIG. 4 shows a variation on FIG. 1 with the primary of transformer, T, split into two oppositely poled windings L1A and L1B, driven by switches S1A and S1B, respectively. The second primary winding L1B assures that available energy from the unisolated (aka upstream or input) side can always be placed in the correct polarity for direct support of the output. That ability reduces the percentage of energy that moves into, and out of, storage, improving efficiency.

An oscillator, Start-up Osc, runs initially to activate switches S1A and S1B through OR gates A1 and A2 to pump energy from input, AC IN, through transformer, T, into storage capacitors, CN & CP. Switches S1A and S1B will never both be on at the same time. If switches S1A and S1B are activated alternately, then energy will be moved to reservoirs CP and CN in alternation. Once the control block, CONTROL, is sufficiently powered by N and/or P, CONTROL takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose. Alternatively, a second pulse transformer could control the second switch.

The output, OUT, filtered by capacitor CO, is regulated to match the reference, REF, by the following process, or its equivalent.

Each control cycle, as clocked by CLK, is divided into two halves. During the first half-cycle, switch S1A or S1B is activated for a constant ON time, energizing transformer T primary winding L1A or L1B. Because flyback energy transfers invert, the polarity chosen is the opposite of the polarity of the demand at the output. Energy is then available at secondary winding L2 in the correct polarity for transfer to OUT through switch S3. Energy transfer continues until 1) the inductive energy is exhausted, as indicated by the voltage at the current sense resistor, SENSE, or 2) until the regulation point is reached. In case 2, remaining inductive energy is transferred to storage element CN or CP, depending on polarity. Switches S2 and S4 can be used for the purpose, or diodes D2 and D4 will transfer remaining inductive energy to the similarly poled storage reservoir without the intervention of the control block, CONTROL.

The second half of the control cycle begins with a test to determine if the output, OUT is larger in magnitude than the reference, REF. If so, then a reverse transfer is performed, where the source of the energy is the output, through S3. Energizing L2 continues until the regulation point is reached. Inductive energy is then transferred from L2 to storage element CN or CP, depending on polarity. Switches S2 and S4 can be used for the purpose, or diodes D2 and D4 will perform that function without the intervention of control block CONTROL.

If, at the start of the second half of the cycle, the output needs to increase in magnitude in the positive direction in order to achieve regulation, then switch S2 is closed to energize from storage CN. Energizing through switch S2 is terminated by predictive energy balancing, or by a predetermined ON time, or by charging to a desired current. The voltage at point A during charging may be useful for developing a volt-time product representing the current in winding L2. Inductive energy is then transferred from L2 to the output through switch S3. If the regulation point is reached before the inductive energy is exhausted, then switch S3 opens, so that remaining inductive energy is transferred to storage element P. Switch S4 can be used for the purpose, or diode D4 will perform that function without the intervention of control block CONTROL.

If the output must increase in magnitude in the negative direction to achieve regulation, then switch S4 is closed to energize from storage CP. Energizing through switch S4 is terminated by predictive energy balancing, or by a predetermined ON time, or by charging to a desired current. Then, inductive energy is transferred from L2 to the output through switch S3. If the regulation point is reached before the inductive energy is exhausted, then switch S3 opens, so that remaining inductive energy is transferred to storage element CN. Switch S2 can be used for the purpose, or diode D2 will perform that function without the intervention of control block CONTROL.

The voltages at P and N may vary over a large range without interfering with normal operation. If they diverge in magnitude beyond a predetermined amount, then control block CONTROL can equalize P and N by energizing to a higher level in the energize step above when energizing from the reservoir larger in magnitude. Then, after reaching regulation at the output, that additional energy is transferred to the reservoir of lesser magnitude.

Control block CONTROL also includes a slow, non-critical control loop which monitors the voltage at N and P. If the total amount of stored energy is too large, then the constant ON time is slightly reduced. If the total amount of stored energy is too small, then the constant ON time is slightly increased. These ON time changes are heavily filtered so as not to reduce the Power Factor by changing the ON time significantly during a single AC cycle.

Figure 5:
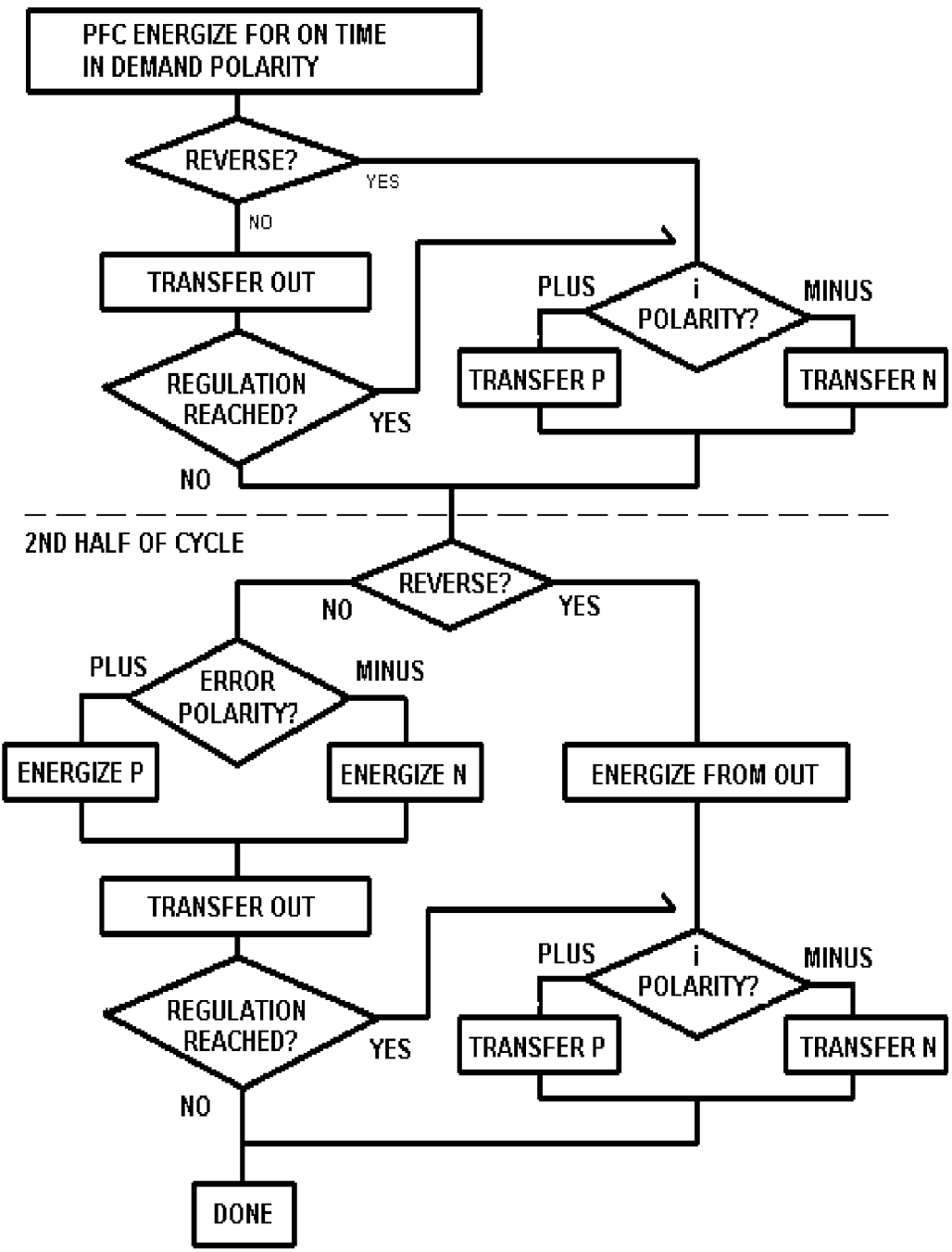
FIG. 5 shows a flow chart for control of the power converter of FIG. 4.

The operation above is shown in flowchart form in FIG. 5. That control can be implemented as a state machine, in programmable logic, in a microcontroller, or using discrete circuitry.

Figure 6:
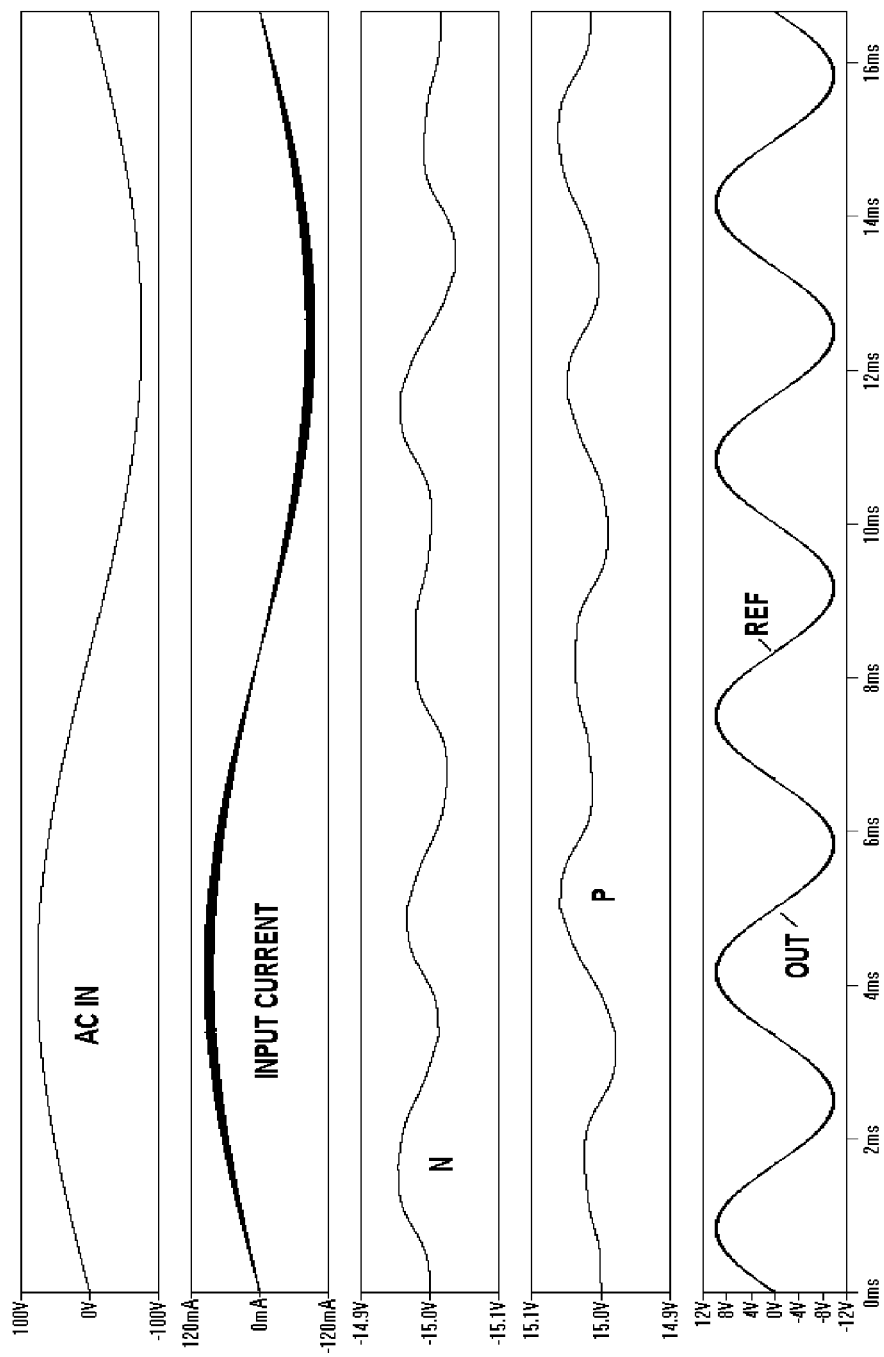
FIG. 6 shows simulated waveforms for the converter of FIG. 4 in operation.

FIG. 6 shows SPICE waveforms of the example of FIG. 4 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated by both the AC input voltage and by the demands at the output. Over the one complete AC cycle shown, voltage N ends at near the level it begins. The fourth trace shows the positive storage voltage, P. Voltage P is seen to increase and decrease, modulated by both the AC input voltage and by the demands at the output. Over the one complete AC cycle shown, voltage P ends at near the level it begins. The fifth axis shows the reference voltage, REF, and the output voltage, OUT. The two traces superimpose so as to be largely indistinguishable. The results shown of FIG. 6 are essentially equivalent to the results of FIG. 3, even though the method of achieving those results is different.

Figure 7:
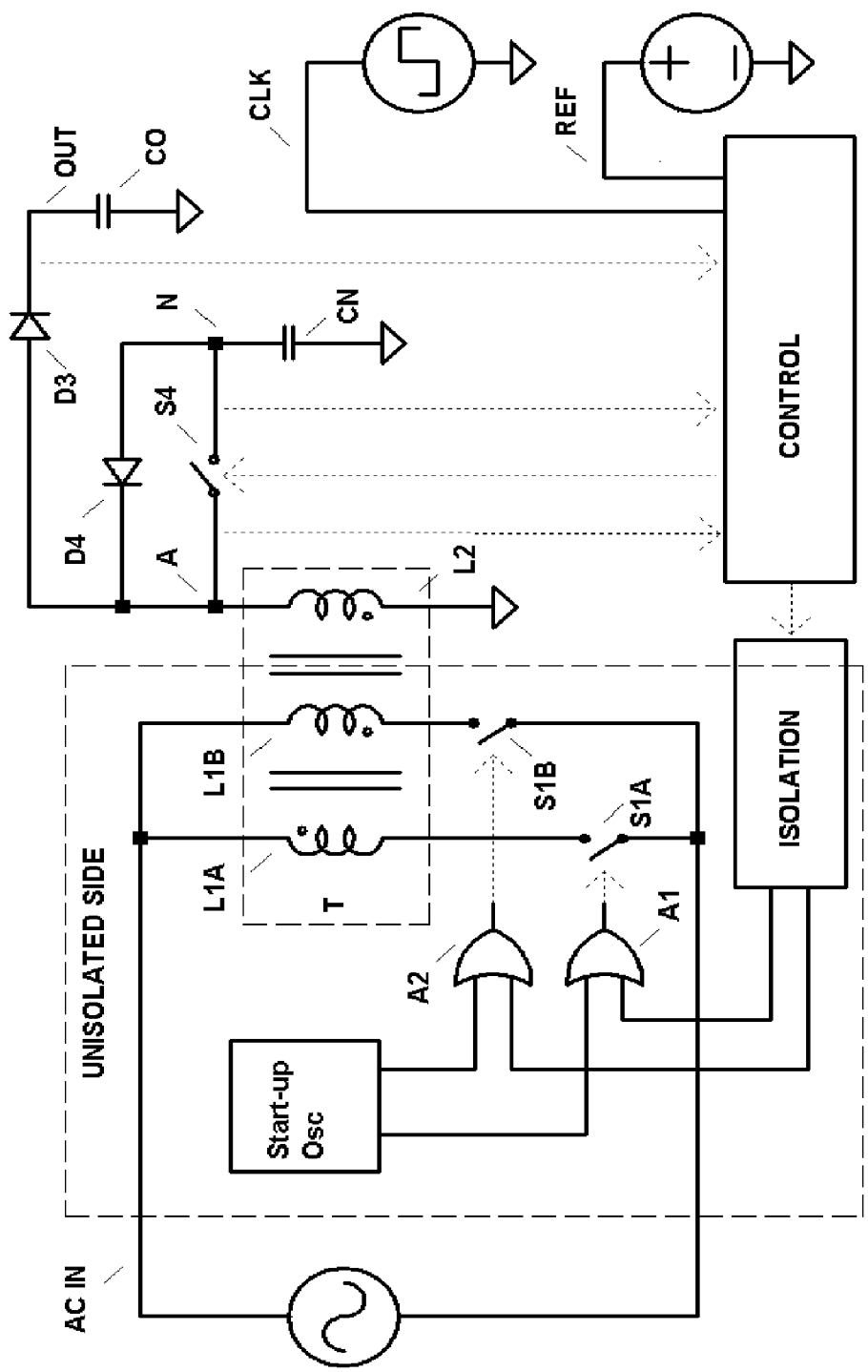
FIG. 7 shows a schematic block diagram of a dual primary, single secondary transformer in a topology with 3 switches forming a unipolar, unidirectional power converter with PFC.

FIG. 7 shows a unipolar output variation on FIG. 1 involving only a single polarity of storage and only one switch on the isolated (aka downstream or output) side. The primary of transformer, T, is split into two oppositely poled windings L1A and L1B, driven by switches S1A and S1B. The second primary winding L1B assures that available energy from the unisolated side can always be placed in the correct polarity for direct support of the output. That ability reduces the percentage of energy that moves into, and out of, storage for improved efficiency. A single-turn pulse transformer can control both isolated side switches based on the polarity of pulses generated. Note that diodes can be inserted in series with windings L1A and L1B so that no bipolar blocking switches would be needed. Without those diodes, switches S1A and S1B are bipolar blocking.

An oscillator, Start-up Osc, runs initially to activate switches S1A and S1B through OR gates A1 and A2 to pump energy from input, AC IN, through transformer, T, into storage capacitor, CN. Because flyback energy transfers invert, the polarity chosen is the opposite of the polarity at N. Once the control block, CONTROL, is sufficiently powered by N, it takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose. For example, a positive-going pulse could turn ON switch S1A, with the return to zero turning OFF switch S1A. A negative-going pulse could turn ON switch S1B, with the return to zero turning OFF switch S1B.

The output, OUT, filtered by capacitor CO, is regulated to match the reference, REF, by the following process, or its equivalent.

Each control cycle, as clocked by CLK, is divided into two halves. During the first half-cycle, either switch S1A or S1B is activated, based on the AC IN polarity, until one of two conditions is met: 1) the constant ON time elapses, thereby meeting the PFC requirement, or 2) the transformer contains enough energy to satisfy the energy demand at the output. In either case, the actual ON time is preserved in digital or analog fashion for use later in the cycle, and the inductive energy is transferred to the output through diode D3. The voltage at point A during charging is useful for developing a volt-time product representing the current in winding L2.

The second half of the control cycle follows a different course for case 1 and 2 above. In case 1, the output did not reach the regulation point, so the next step is to energize L2 from the storage reservoir, CN, through switch S4 up to the demand energy, as calculated by the CONTROL block. Case 1 completes with the transfer of that energy through diode D3 to support the output, OUT. In case 1, the PFC requirement is met in the first half-cycle, and the regulation requirement is divided between half-cycles.

In case 2, the output did reach the regulation point, but the PFC ON time was not completed, so the next step is to energize L2 from the AC input, AC IN, for the remainder of the ON time requirement. Note that there is not a linear relationship between PFC ON time and energy, so calculation circuitry is used to determine the necessary additional PFC ON time required. That calculation can be done by the CONTROL block, or, for speed and simplicity, a table embodied in a memory can contain that information such that, for any first half-cycle PFC ON time, the table contains a corresponding second half-cycle PFC ON time. Case 2 completes with the transfer of the inductive energy through diode D4 or switch S4 to storage reservoir, CN. In case 2, the regulation requirement is met in the first half-cycle, and the PFC requirement is divided between half-cycles.

The voltage at N may vary over a large range during normal operation. Control block CONTROL also includes a slow, non-critical control loop which monitors the voltage at N. If N becomes too large, then the constant ON time is slightly reduced. If N becomes too small, then the constant ON time is slightly increased. These ON time changes are heavily filtered so as not to reduce the Power Factor by changing the ON time significantly during a single AC cycle.

Figure 8:
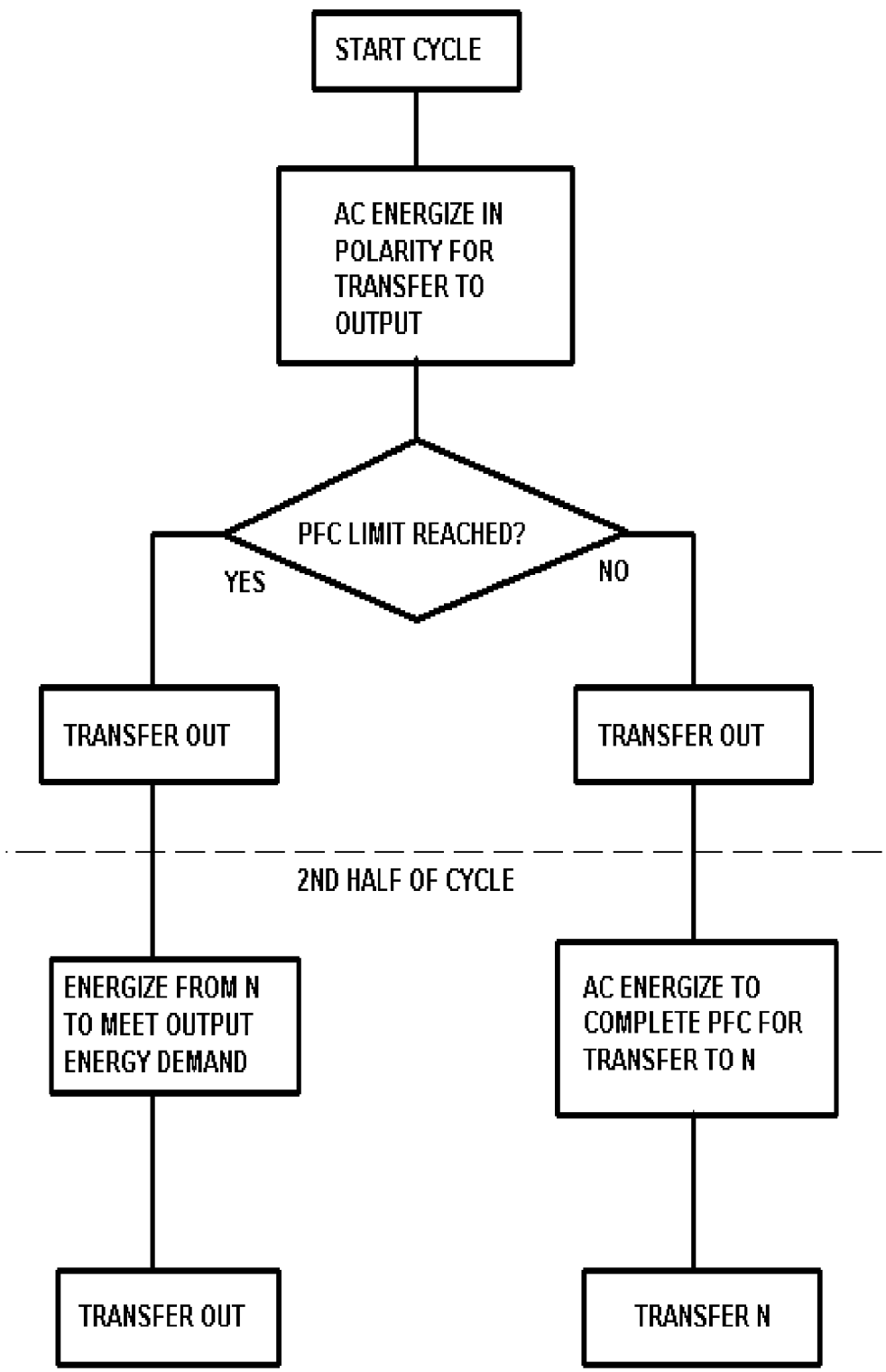
FIG. 8 shows a flow chart for control of the power converter of FIG. 7.

The operation above is shown in flowchart form in FIG. 8. That control can be implemented as a state machine, in programmable logic, in a microcontroller, or using discrete circuitry.

Figure 9:
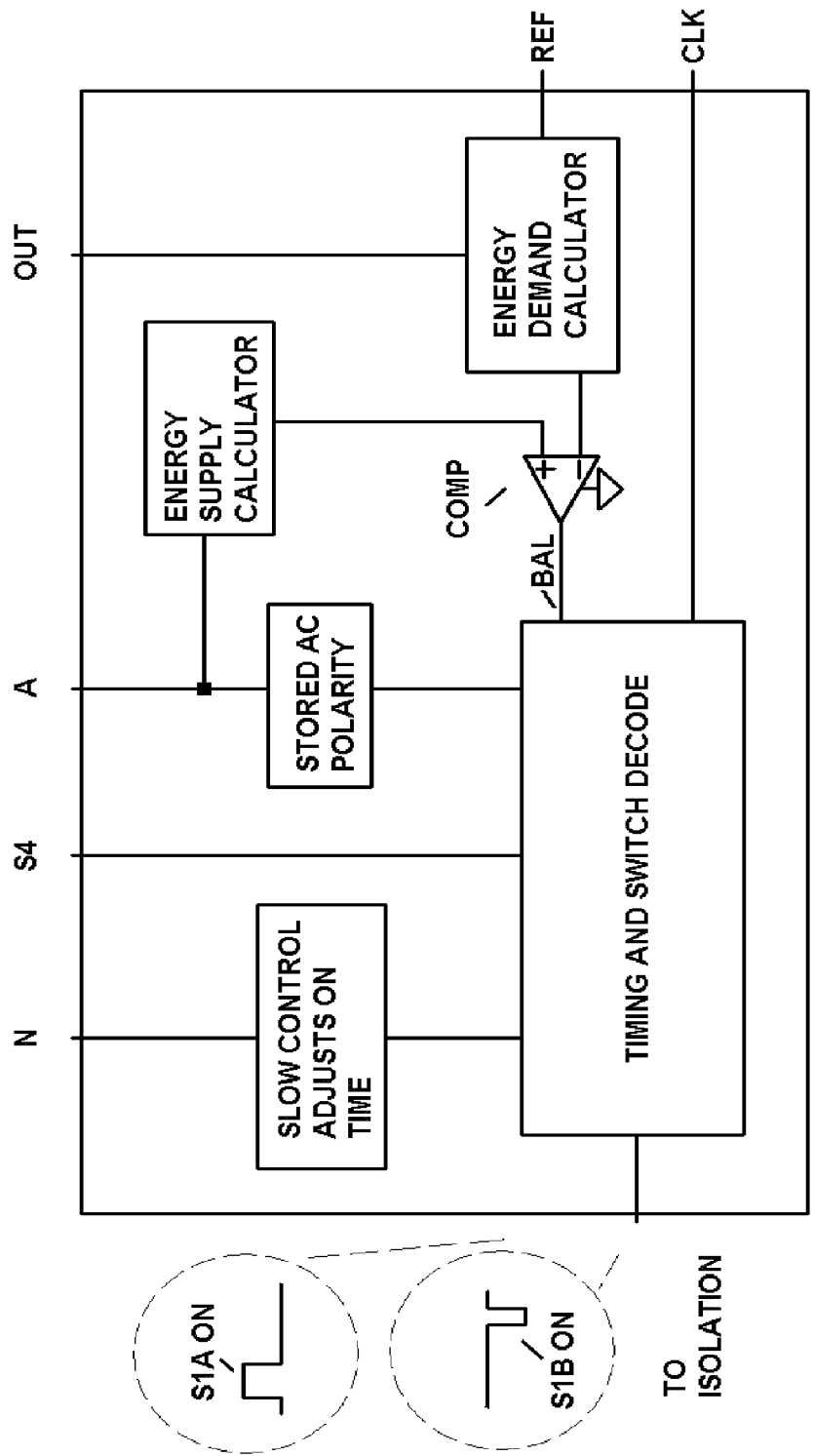
FIG. 9 shows a schematic block diagram of a detail of the control block of FIG. 7.

FIG. 9 shows a detail of the contents of the CONTROL block of FIG. 7. The ENERGY DEMAND CALCULATOR uses output OUT and reference REF to calculate energy demand: $(REF^2-OUT^2)*scaling$. The scaling term adjusts for the ratio of switched inductance to filter capacitance. The ENERGY SUPPLY CALCULATOR uses a volt-time product representing the inductive current to generate a term linearly proportional to energy supply: (node A voltage*charging time)$^2$. Comparator, COMP, compares the supply and demand terms, to produce a balance signal, BAL, which is used to predictively terminate energizing periods.

The improved transient response provided by the predictive energy balancing method described above is not necessary for operation. A conventional control method will also serve. In that case, demand is calculated based on the difference between REF and OUT, and supply is a volt-time product derived at point A during charging or a measurement of inductor current, without squaring.

The block STORED AC POLARITY preserves the last polarity, because the AC input voltage polarity is not directly known on the isolated side of the power converter until switch S1A or S1B is closed. Just after zero crossing, that stored polarity information will be wrong for one cycle, but that fact is of little consequence because there is little AC energy available at the time of zero crossing.

The block TIMING AND SWITCH DECODE performs the steps in the flowchart of FIG. 8, as paced by clock, CLK. That block provides switch drive for switch S4 and drive for the isolation block, ISOLATION. Here, during a positive pulse, switch S1A turns on, and, during a negative pulse, switch S1B turns on. A conventional filtered feedback loop, SLOW CONTROL ADJUSTS ON TIME, monitors the storage voltage, N. The ON time is modulated to cause the average storage voltage to approximate a predetermined target. The target in one possible implementation is −36 volts for an output voltage of 24 volts. Voltage N is of opposite polarity to the output voltage, but can be greater or lesser in magnitude.

Figure 10:
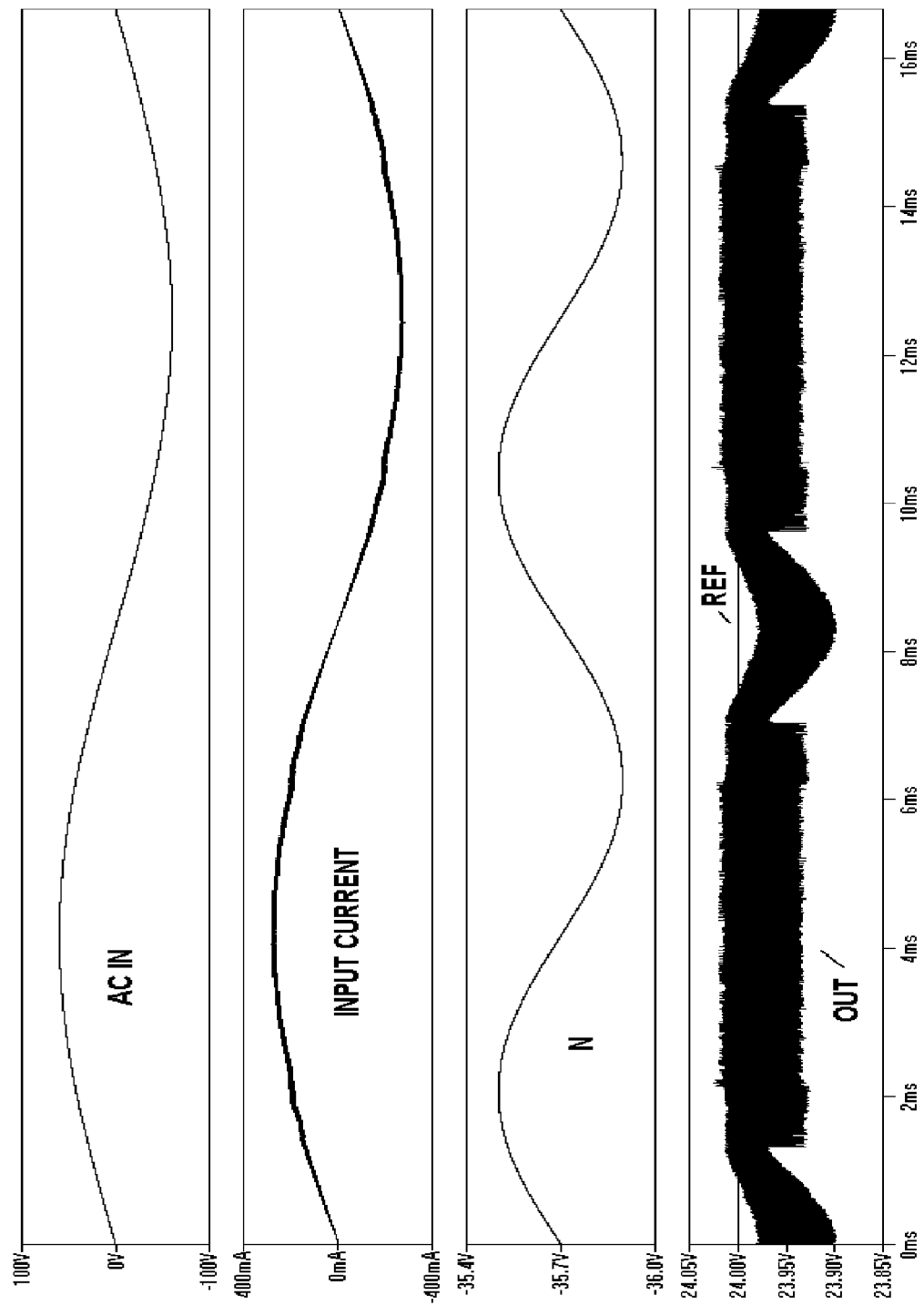
FIG. 10 shows simulated waveforms for the converter of FIG. 7 in operation.

FIG. 10 shows SPICE waveforms of the example of FIG. 7 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. Over the one complete AC cycle shown, voltage N ends at near the level it begins. The fourth axis shows the reference voltage, REF, and the output voltage, OUT. The vertical scale is expanded so that the output ripple of approximately 100 my can be seen as the width of the output trace.

Figure 11:
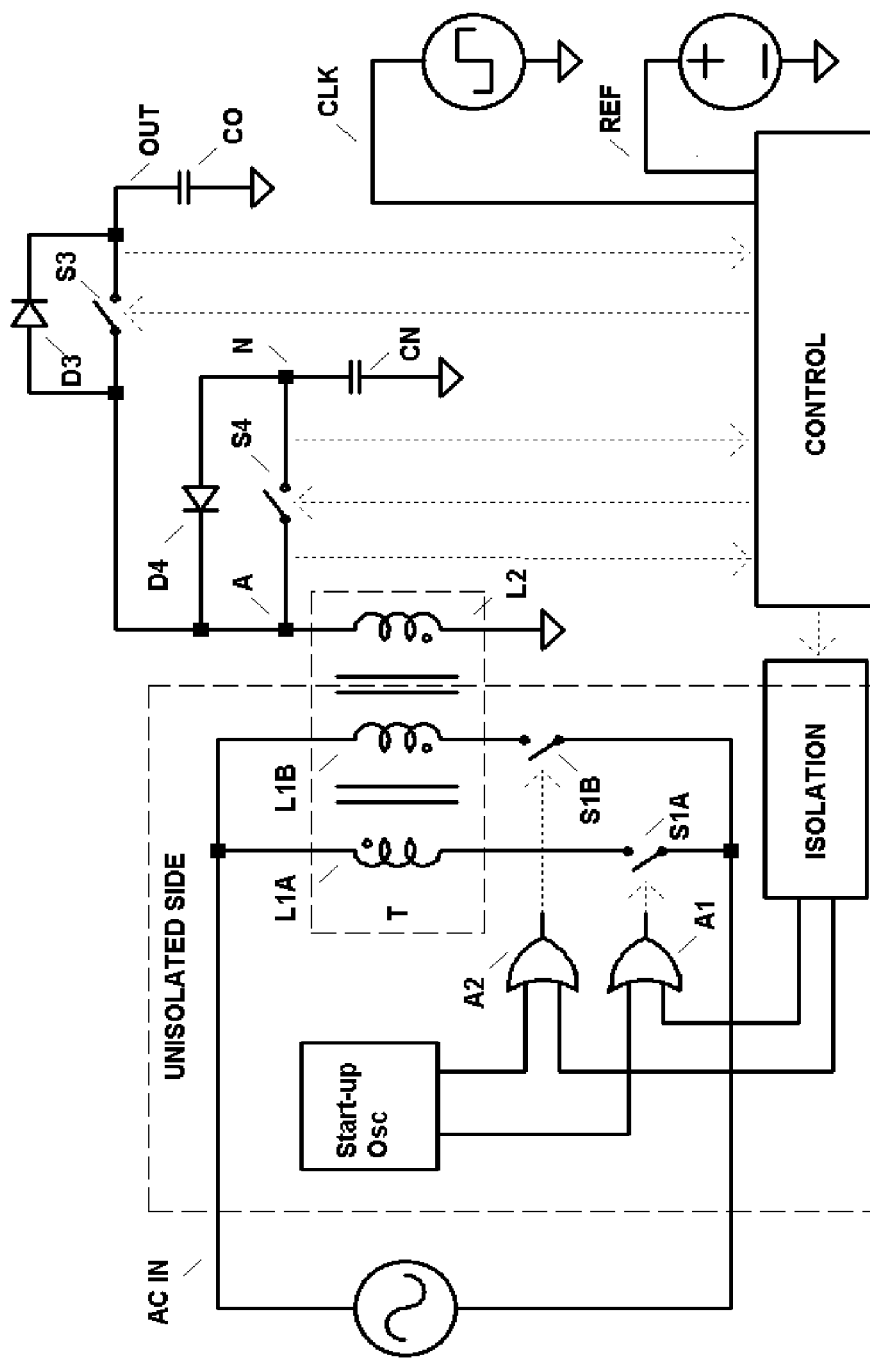
FIG. 11 shows a schematic block diagram of a dual primary, single secondary transformer in a topology with 4 switches forming a unipolar, bidirectional power converter with PFC.

FIG. 11 shows a bidirectional variation of FIG. 7 involving only the addition of one unipolar blocking switch S3 connected across diode D3, plus the control for that switch. The primary of transformer, T, split into oppositely poled windings L1A and L1B, is driven by switches S1A and S1B. The second primary winding S1B assures that available energy from the unisolated side can always be placed in the correct polarity for direct support of the output. That ability reduces the percentage of energy that moves into, and out of, storage for improved efficiency. A single-turn pulse transformer can control both isolated side switches based on the polarity of pulses generated.

An oscillator, Start-up Osc, runs initially to activate switches S1A and S1B through OR gates A1 and A2 to pump energy from input, AC IN, through transformer, T, into storage capacitor, CN. Once the control block, CONTROL, is sufficiently powered by N, it takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, it is established which direction energy needs to move in order to achieve regulation. If a forward transfer is indicated, meaning the output should increase, then the steps taken exactly follow the steps in the example of FIG. 7. For clarity, those steps are repeated here.

During the first half-cycle, either switch S1A or S1B is activated, based on the AC IN polarity, until one of two conditions is met: 1) the constant ON time elapses, or 2) the transformer contains enough energy to satisfy the energy demand at the output. In either case, the actual ON time is stored for use later in the cycle, and the inductive energy in L2 is transferred to the output through diode D3. The voltage at point A during charging is useful for developing a volt-time product representing the energizing current in transformer T for step 2, above.

The second half of the control cycle follows a different course for case 1 and 2 above. In case 1, the output did not reach the regulation point, so the next step is to energize L2 from the storage reservoir, N, up to the demand energy, as calculated by the CONTROL block. Case 1 completes with the transfer of that L2 energy through diode D3 to support the output, OUT. In this case, the PFC requirement is met in the first half-cycle, and the regulation requirement is met in the second half-cycle.

In case 2, the output did reach the regulation point, but the PFC ON time was not completed, so the next step is to energize from the AC input, AC IN, for the remainder of the ON time requirement. Note that there is not a linear relationship between PFC ON time and energy, so a calculation is involved to determine the necessary additional PFC ON time required. That calculation can be done by the CONTROL block, or, for speed and simplicity, a table can contain that information such that for any first half-cycle PFC ON time, there is a corresponding second half-cycle PFC ON time. Case 2 completes with the transfer of that energy in L2 through diode D4 or switch S4 to storage reservoir, CN. In this case, the regulation requirement is met in the first half-cycle, and the PFC requirement is met in the second half-cycle.

If, at the start of the first half-cycle, it is established that energy needs to move in the reverse direction, that is, the output magnitude should decrease, then a reverse transfer is indicated. During the first half-cycle, either switch S1A or S1B is activated, based on the AC IN polarity, so that energy is correctly poled to be transferred to storage reservoir CN, and energizing L1 continues until the PFC ON time has elapsed. That energy is then transferred to CN via diode D4, or by a switch, S4, used as a synchronous rectifier. In the second half of the cycle, switch S3 energizes transformer winding L2 until the regulation point is reached. That energy is then transferred to CN via diode D4, or by a switch, S4, used as a synchronous rectifier. When following this control path, the PFC requirement is met in the first half-cycle, and the regulation requirement is met in the second half-cycle.

The voltage at N may vary over a large range during normal operation. Control block CONTROL also includes a slow, non-critical control loop which monitors the voltage at N. If N becomes too large, then the constant ON time is slightly reduced. If N becomes too small, then the constant ON time is slightly increased. These ON time changes are heavily filtered so as not to reduce the Power Factor by changing the ON time significantly during a single AC cycle.

Figure 12:
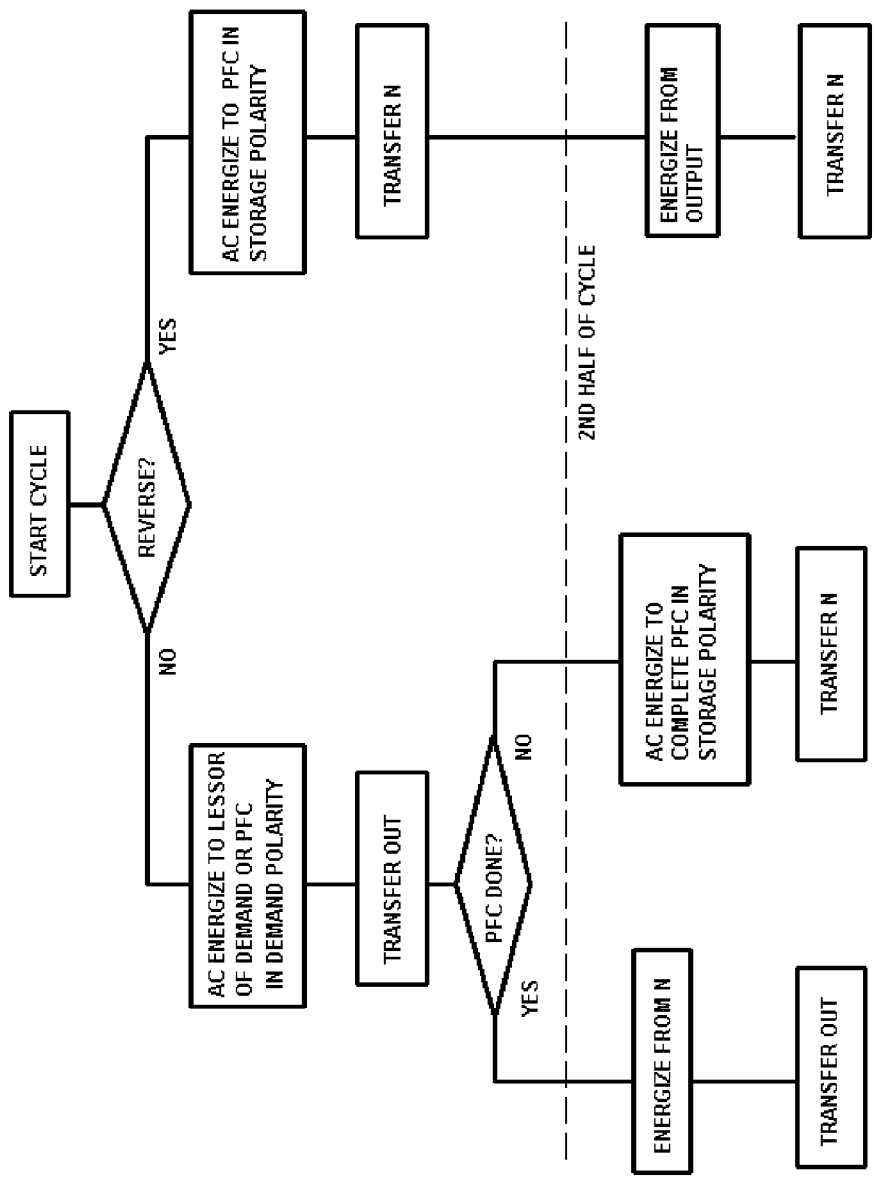
FIG. 12 shows a flow chart for control of the power converter of FIG. 11.

The operation above is shown in flowchart form in FIG. 12. That control can be implemented as a state machine, in programmable logic, in a microcontroller, or using discrete circuitry.

Figure 13:
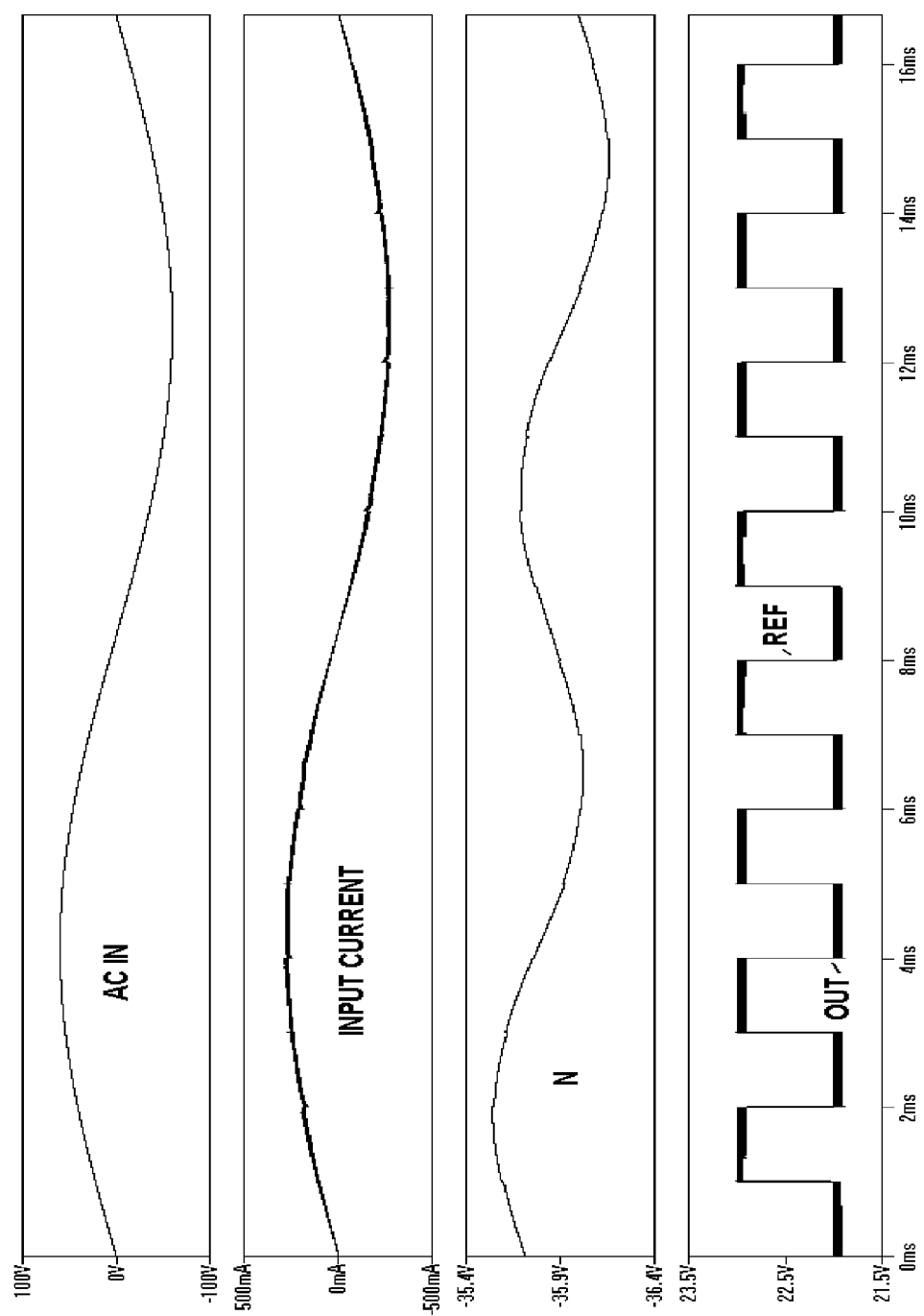
FIG. 13 shows simulated waveforms for the converter of FIG. 11 in operation.

FIG. 13 shows SPICE waveforms of the example of FIG. 11 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. Over the one complete AC cycle shown, voltage N ends more negative than it begins. That indicates that the ON time is longer than it needs to be to maintain an average storage voltage of 36 volts at point N. Remember that the ON time changes only slowly, so it may take many AC cycles to stabilize. The fourth axis shows the reference voltage, REF, here an offset square wave at 500 Hz with an amplitude of 2 volts, and the output voltage, OUT. The bidirectional regulation can be seen as the power converter follows both the positive and negative transitions faithfully.

Figure 14:
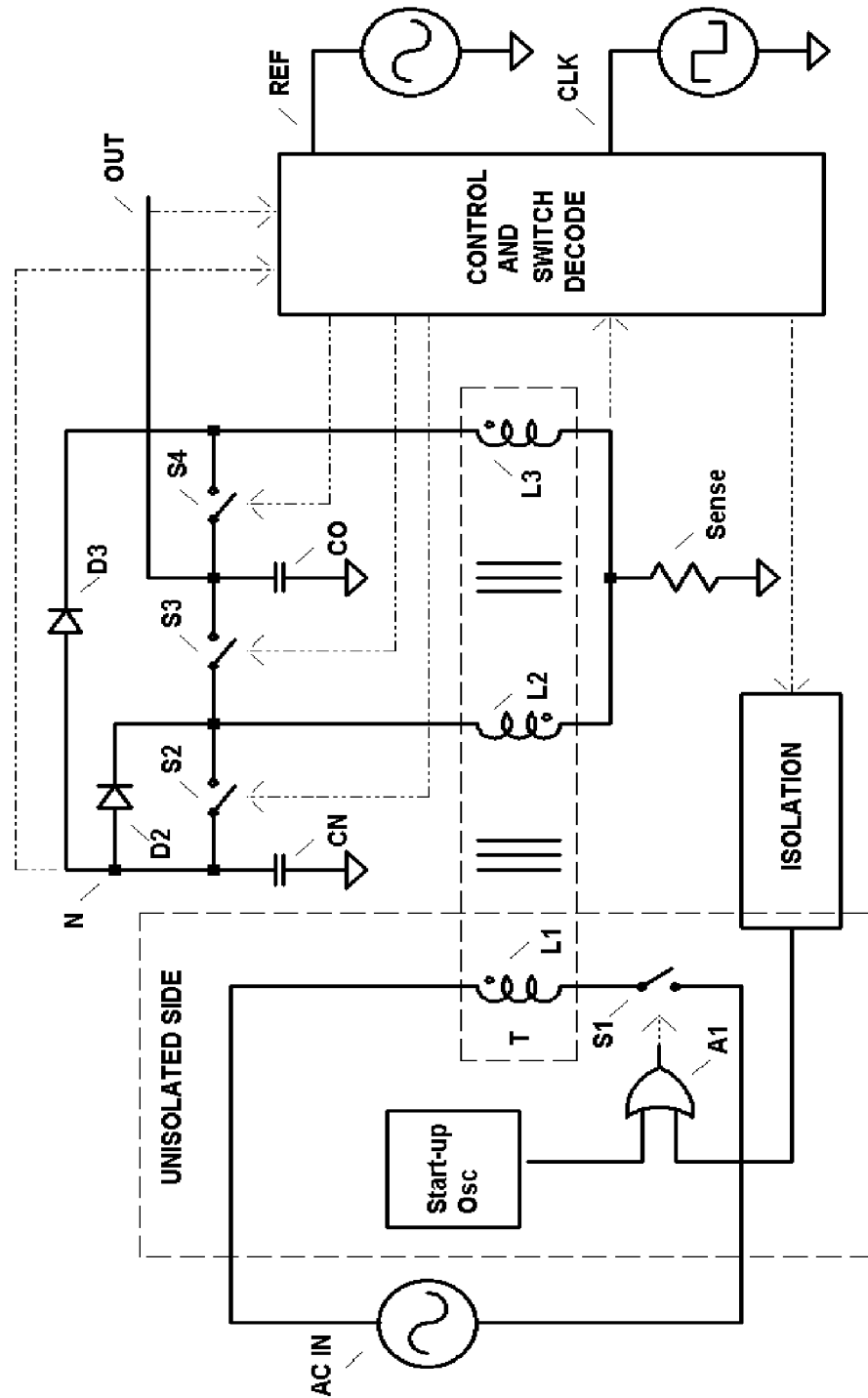
FIG. 14 shows a schematic block diagram of a single primary, dual secondary transformer in a topology with 4 switches, 3 of which are bipolar blocking, forming a bipolar, bidirectional power converter with PFC.

FIG. 14 shows a bipolar, bidirectional topology employing a dual secondary winding for transformer T, consisting of two oppositely poled windings L2 and L3. The isolated side winding, L1, is driven by switch S1. The two secondary windings assure that available energy from the unisolated side can always be applied in the correct polarity for direct support of the output. That ability reduces the percentage of energy that moves into, and out of, storage for improved efficiency. A single-turn pulse transformer can isolate the control for the unisolated side switch.

Again, an oscillator, Start-up Osc, runs initially to activate switch S1 through OR gate A1 to pump energy from input, AC IN, through transformer, T, into storage capacitor, CN. Once the control block, CONTROL AND SWITCH DECODE, is sufficiently powered by N, CONTROL AND SWITCH DECODE takes over the operation of S1, via wireless communication through isolation block, ISOLATION, and through OR gate A1. Isolation block, ISOLATION, can be a commercially available digital isolator, or a pulse transformer. A small toroid core with as little as a single turn for primary and secondary in combination with pulse detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, switch S1 is activated until the constant ON time period elapses. If the input energy polarity matches the output demand polarity, then inductive energy is transferred to OUT through L3 and S4. If the input energy polarity does not match the output demand polarity, then inductive energy is transferred to OUT through L2 and S3. In either case, either S3 or S4 is turned off by CONTROL AND SWITCH DECODE when the demand is met. Excess inductive energy, if any, then passes through either D2 or D3 into storage reservoir CN.

At the start of the second half-cycle, it is established whether energy needs to move in the forward or reverse direction. If the output magnitude needs to increase, then a forward transfer is indicated. If the output magnitude needs to decrease, then a reverse transfer is indicated. For the forward case, the next step is to energize L2 from the storage reservoir, CN, through switch S2 up to the demand energy, as calculated by the CONTROL AND SWITCH DECODE block. Current sense resistor, Sense, provides a voltage proportional to inductive current for determining energy supply, or a volt-time product can provide that information. Then, based on the polarity of demand at the output, energy is transferred from L2 or L3 to OUT through either switch S3 or S4. For the reverse case, the next step is to energize L2 or L3 from the output through either switch S3 or S4 until the regulation point is reached, at which point the switch is opened. Then, that energy will transfer to storage reservoir, CN, through diode D2 or D3. In this topology, the PFC requirement is met in the first half-cycle, and the regulation requirement is met in the second half-cycle.

The voltage at N may vary over a large range without interfering with normal operation. Control block CONTROL AND SWITCH DECODE also includes a slow, non-critical control loop which monitors the voltage at N. If N becomes too large, the constant ON time is slightly reduced. If N becomes too small, the constant ON time is slightly increased. These ON time changes are heavily filtered so as not to reduce the Power Factor by changing the ON time significantly during a single AC cycle.

Figure 15:
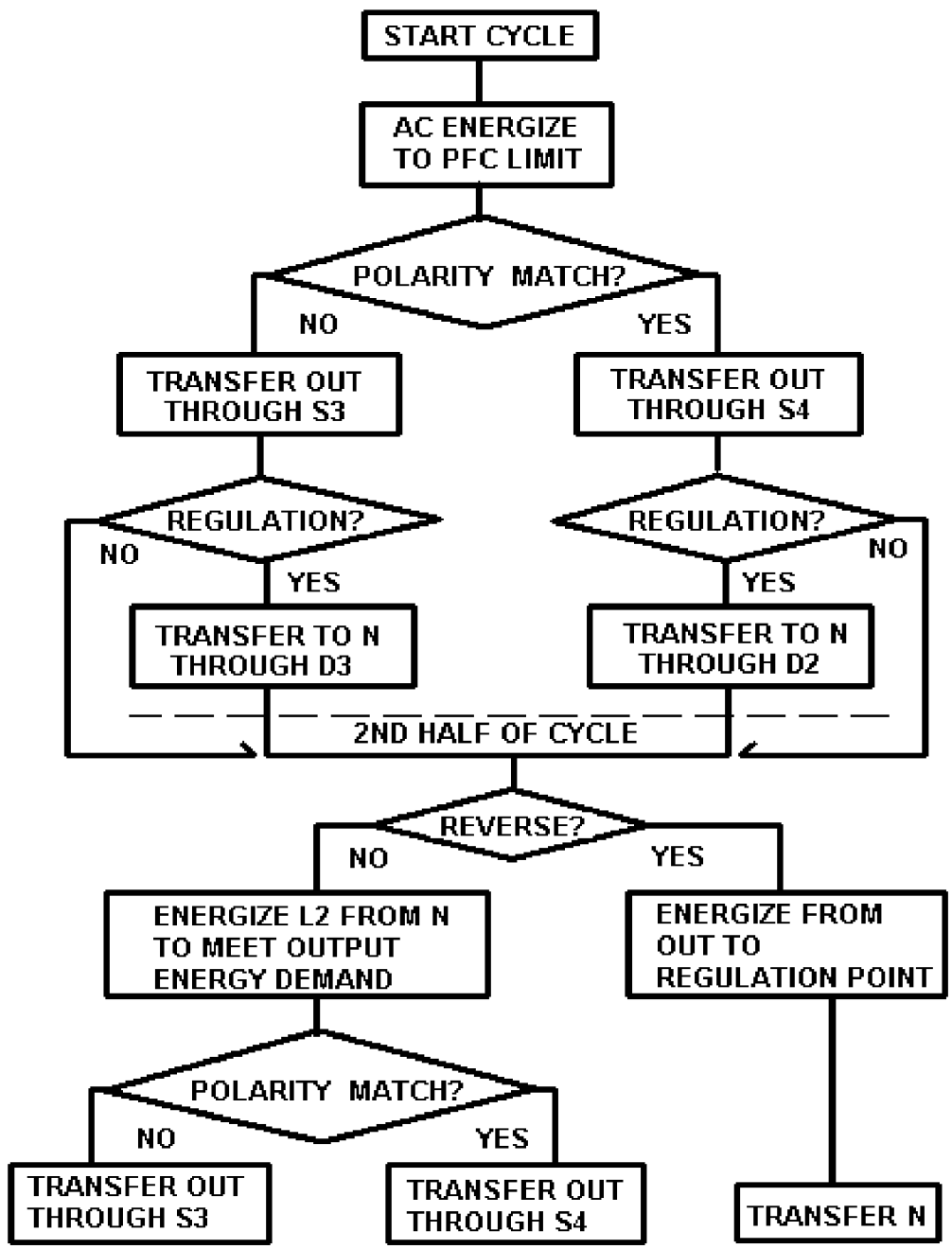
FIG. 15 shows a flow chart for control of the power converter of FIG. 14.

The operation above is shown in flowchart form in FIG. 15. That control can be implemented as a state machine, in programmable logic, in a microcontroller, or using discrete circuitry.

Figure 16:
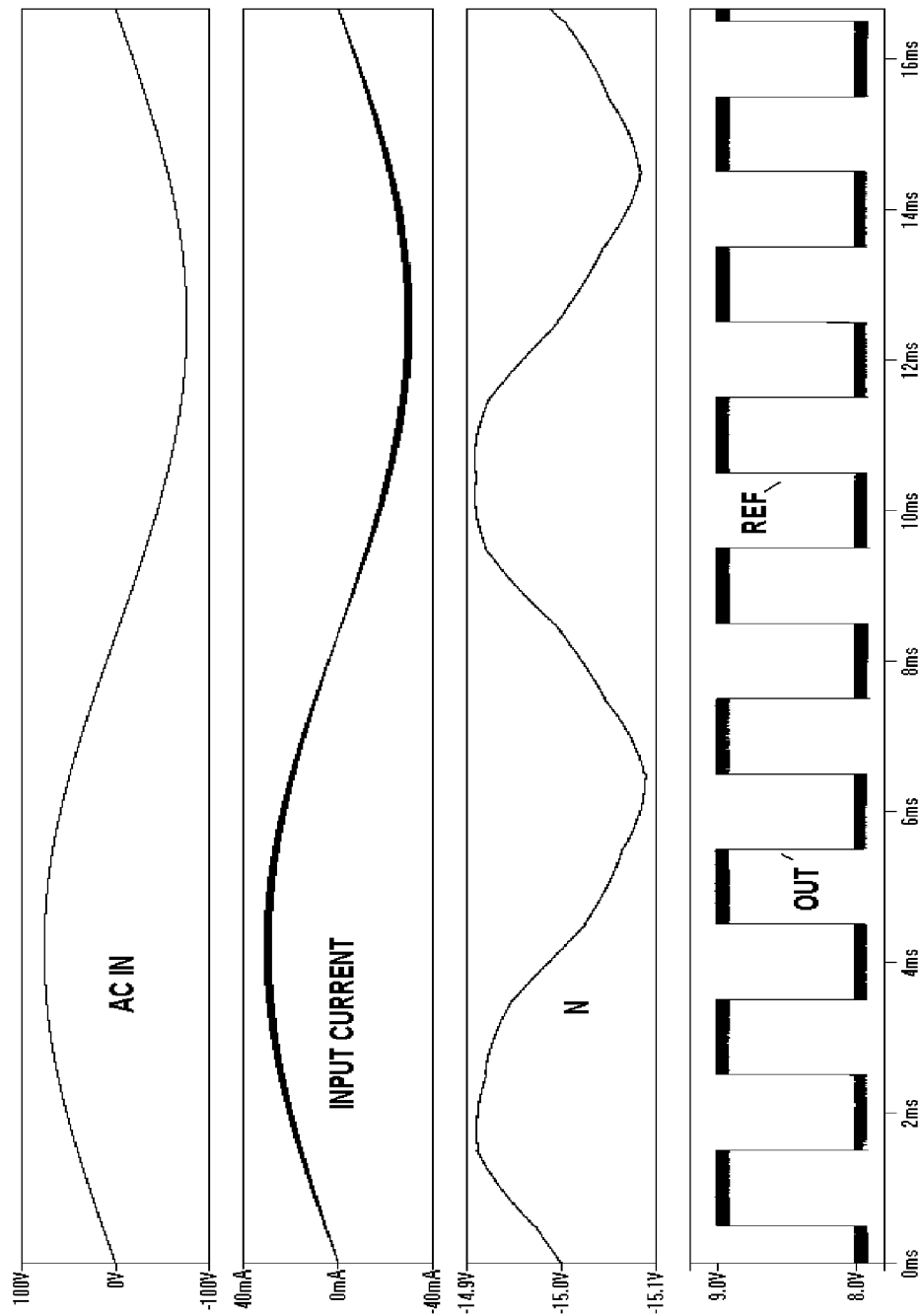
FIG. 16 shows simulated waveforms for the converter of FIG. 14 in unipolar operation.

FIG. 16 shows SPICE waveforms of the example of FIG. 14 in unipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. The fourth axis shows the reference voltage, REF, here an offset square wave at 500 Hz with an amplitude of 1 volt, and the output voltage, OUT. The bidirectional behavior can be seen as the power converter faithfully follows both the positive and negative transitions of the reference voltage.

Figure 17:
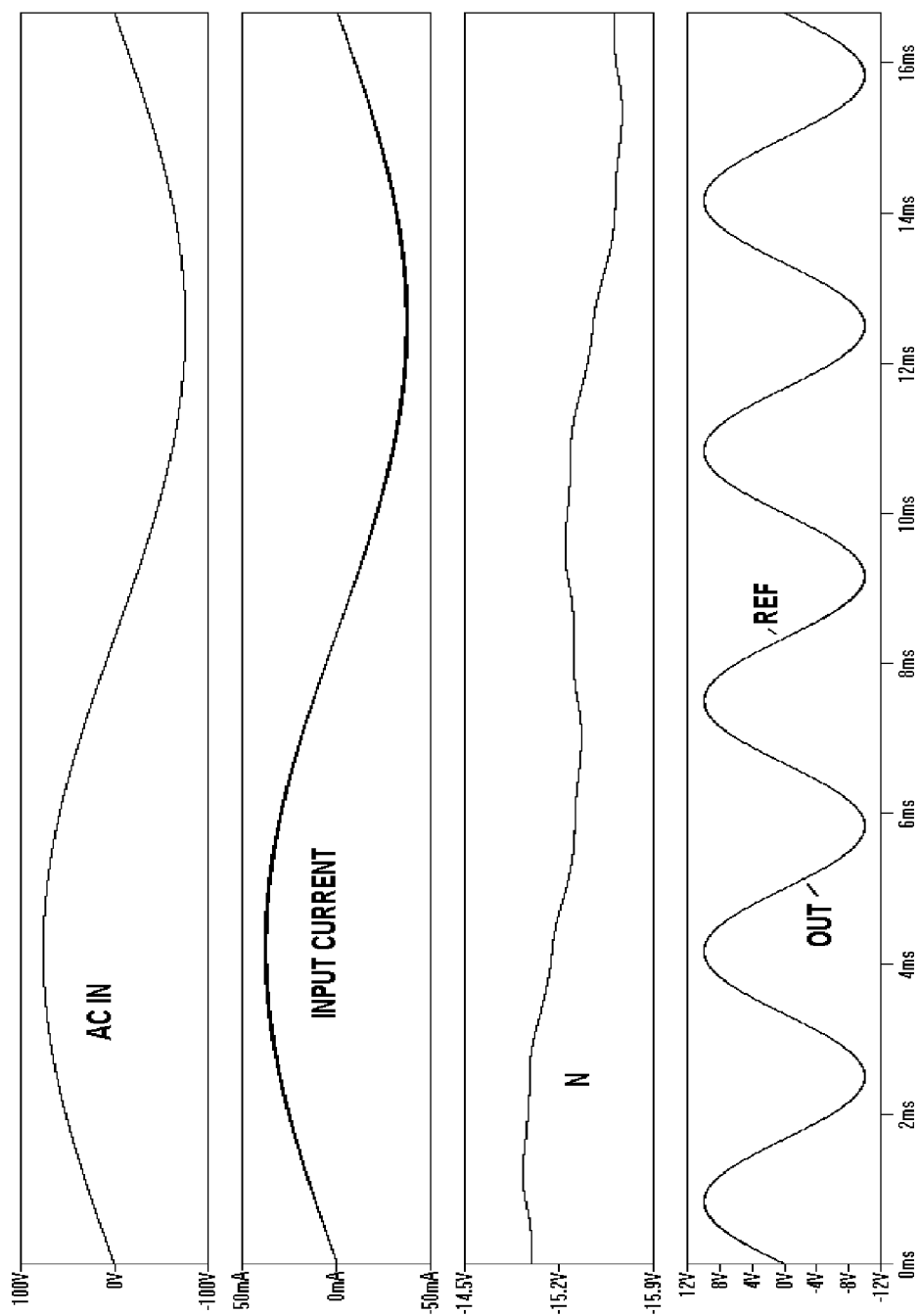
FIG. 17 shows simulated waveforms for the converter of FIG. 14 in bipolar operation.

FIG. 17 shows SPICE waveforms of the example of FIG. 14 in bipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated by twice the frequency of the AC input voltage and by the output frequency. The ON time is here longer than needed to maintain the storage voltage at −15.5 volts, so N is seen to increase in magnitude. The fourth axis shows the reference voltage, REF, here a sine wave at 300 Hz with an amplitude of +/−10 volts, and the output voltage, OUT. The bipolar, bidirectional behavior can be seen as the output trace is indistinguishable from the reference trace.

Figure 18:
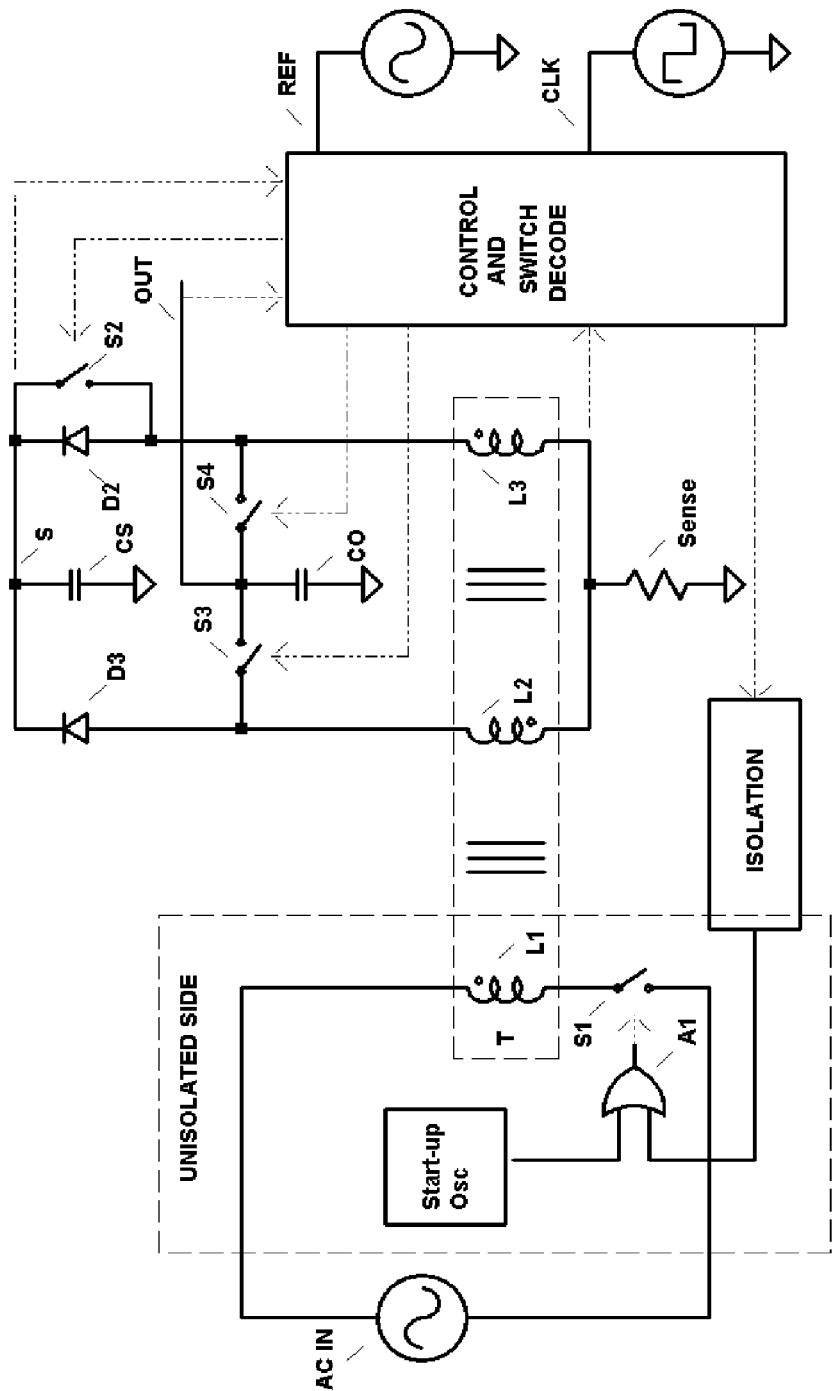
FIG. 18 shows a schematic block diagram of the power converter of FIG. 14 with a positively poled storage reservoir.

FIG. 18 shows the power converter of FIG. 14 with a positive storage voltage. Compared with diodes D2 and D3 and switch S2 of FIG. 14, the locations of the two diodes D2 and D3 and switch S2 in FIG. 18 are reversed to reverse the storage voltage polarity. The storage capacitor is renamed CS, and the storage voltage is renamed as S. The only change in control exchanges the selection of S3 and S4 as used when transferring energy from storage to the output. Since this topology of power converter can utilize positive or negative storage, system requirements can determine the preferred polarity for the storage reservoir.

Figure 19:
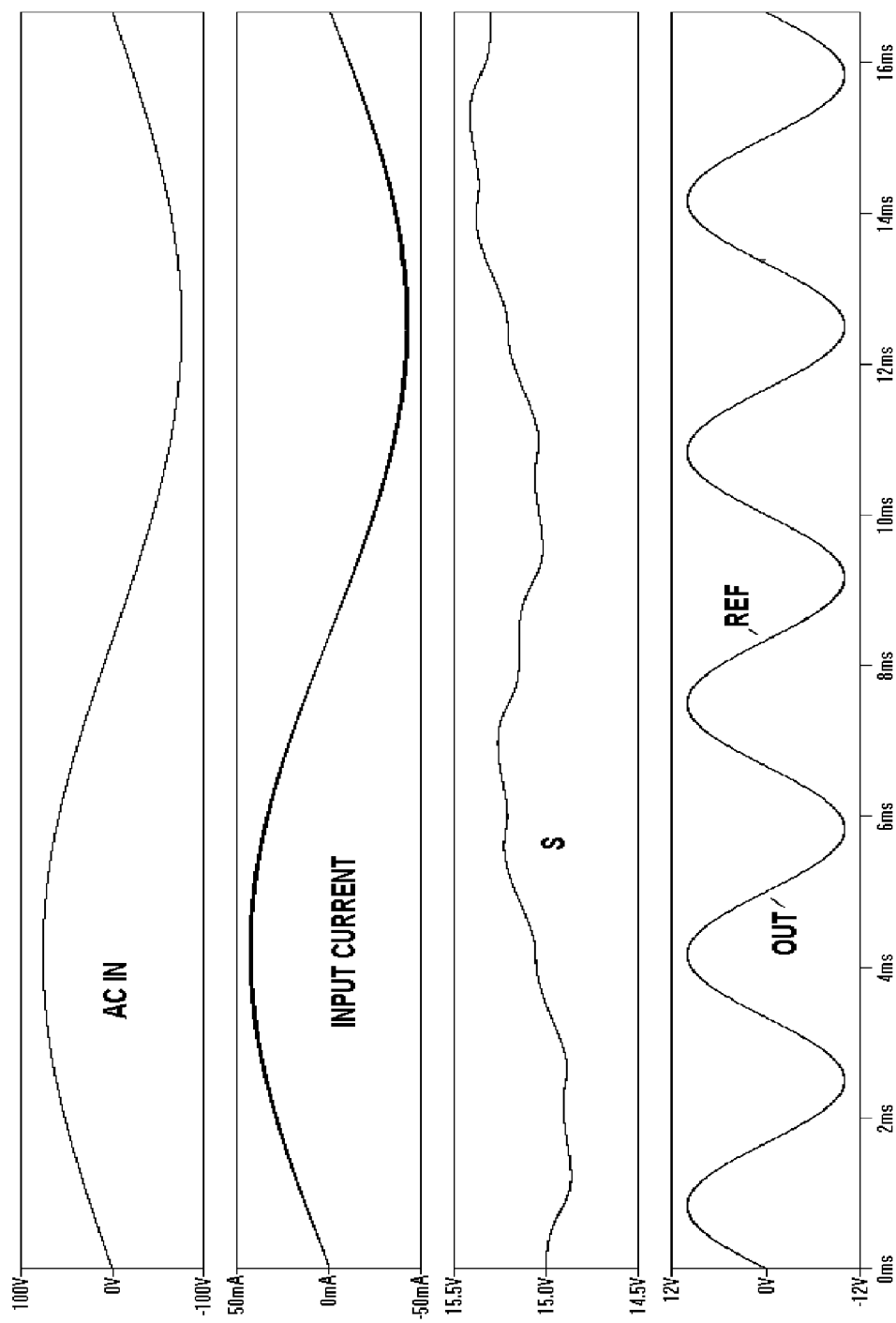
FIG. 19 shows simulated waveforms for the converter of FIG. 18 in operation.

FIG. 19 shows SPICE waveforms of the example of FIG. 18 in bipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the positive storage voltage, S. Voltage S is seen to increase and decrease, modulated by twice the frequency of the AC input voltage and by the output frequency. The ON time is here longer than needed to maintain the storage voltage at 15 volts, as indicated by the increase in S over one AC cycle. The fourth axis shows the reference voltage, REF, here a sine wave at 300 Hz with an amplitude of +/−10 volts, and the output voltage, OUT. The bipolar, bidirectional behavior can be seen as the output trace is indistinguishable from the reference trace.

A unipolar variation on the power converter of FIG. 18 can use a rectified AC input, allowing switch S1 to be a conventional switch with a body diode. Then, for a unipolar output voltage, switch S3 or S4 can be eliminated, depending on output polarity. The result is a bidirectional, unipolar power converter with PFC requiring one bipolar blocking switch S2 and two unipolar blocking switches S1 and either S3 or S4.

Figure 20:
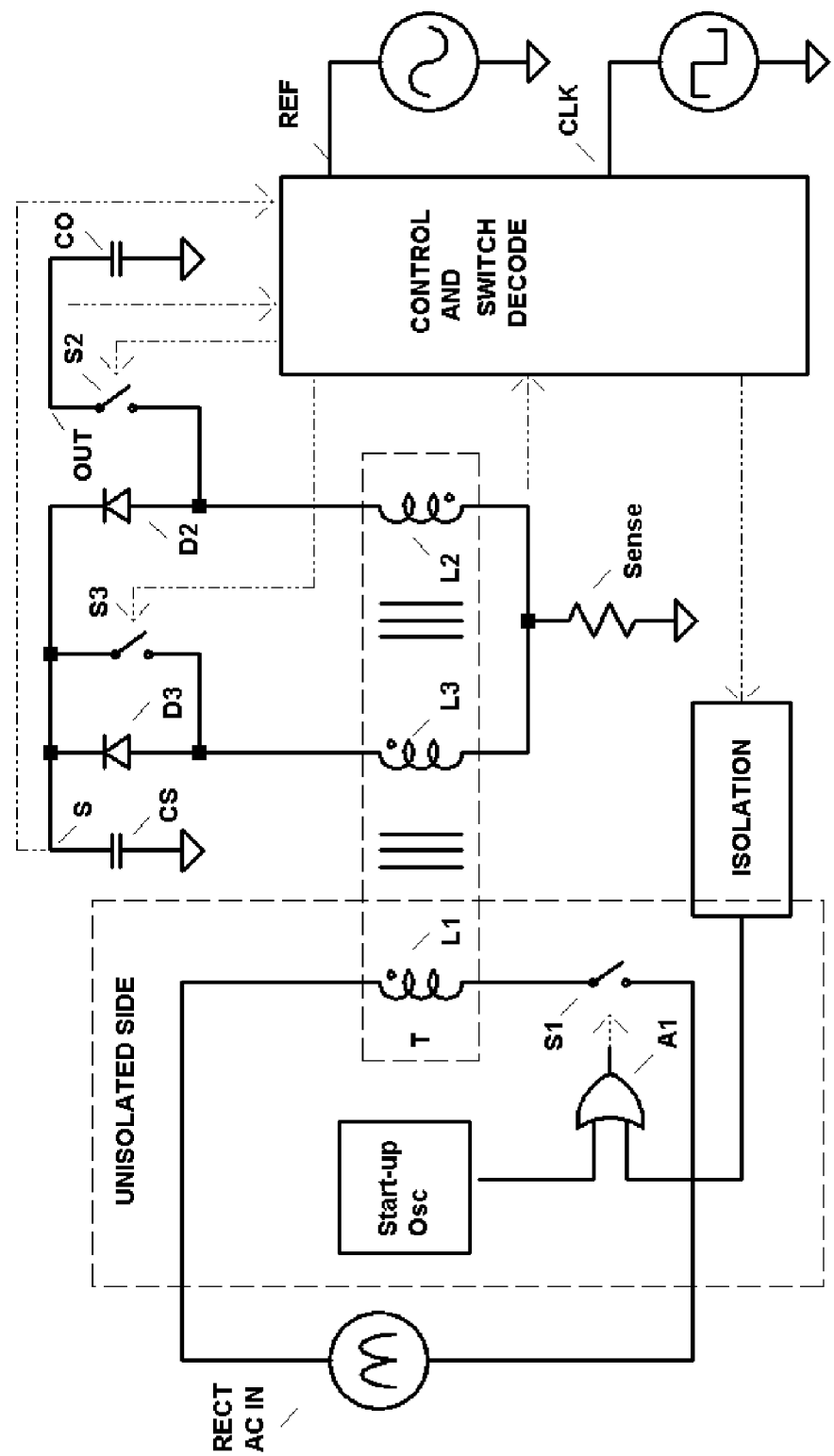
FIG. 20 shows a schematic block diagram of a single primary, dual secondary transformer in a topology with 3 switches, 1 of which is bipolar blocking, forming a unipolar, bidirectional power converter with PFC.

FIG. 20 shows a unipolar, bidirectional topology employing a dual secondary winding for transformer T, consisting of oppositely poled windings L2 and L3. In FIG. 20, both the storage voltage, S, and the output, OUT, are positive. The AC input, RECT AC IN, is received as a rectified input in this case. The isolated side winding, L1, is driven by switch S1, which need not be bipolar blocking. The two secondary windings assure that available energy from the unisolated side can always be applied in the correct polarity for direct support of the output. That ability reduces the percentage of energy that moves into, and out of, storage for improved efficiency. A single-turn pulse transformer can isolate the control for the unisolated side switch.

An oscillator, Start-up Osc, runs initially to activate switch S1 through OR gate A1 to pump energy from input, RECT AC IN, through transformer, T, and diode D3 into storage capacitor, CS. Once the control block, CONTROL AND SWITCH DECODE, is sufficiently powered by S, CONTROL AND SWITCH DECODE takes over the operation of S1, via wireless communication through isolation block, ISOLATION, and through OR gate A1. Isolation block, ISOLATION, can be a commercially available digital isolator, or a pulse transformer. A small toroid core with as little as a single turn for primary and secondary in combination with pulse detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, switch S1 is activated until the constant ON time period elapses. Then, L2 energy is transferred to OUT through S2 until any demand is met. Once the regulation point has been reached, switch S2 opens, and any excess inductive energy in L2 passes through D2 into storage reservoir CS.

At the start of the second half-cycle, it is established whether energy needs to move in the forward or reverse direction. If the output magnitude needs to increase, then a forward transfer is indicated. If the output magnitude needs to decrease, then a reverse transfer is indicated. For the forward case, the next step is to energize L3 from the storage reservoir, CS, through switch S3 up to the demand energy, as calculated by the CONTROL AND SWITCH DECODE block. Current sense resistor, Sense, can provide a voltage proportional to inductive current for determining energy supply. Then, energy is transferred from L2 to OUT through switch S2. For the reverse case, the next step is to energize L2 from the output through switch S2 until the regulation point is reached at which point the switch is opened. Then, that energy will transfer from L3 to storage reservoir, CS, through diode D3 or switch S3. In this topology, the PFC requirement is met in the first half-cycle, and the regulation requirement is met in the second half-cycle.

The voltage at S may vary over a large range without interfering with normal operation. Control block CONTROL AND SWITCH DECODE also includes a slow, non-critical control loop which monitors the voltage at S. If S becomes too large, then the constant ON time is slightly reduced. If S becomes too small, then the constant ON time is slightly increased. These ON time changes are heavily filtered so as not to reduce the Power Factor by changing the ON time significantly during a single AC cycle.

Figure 21:
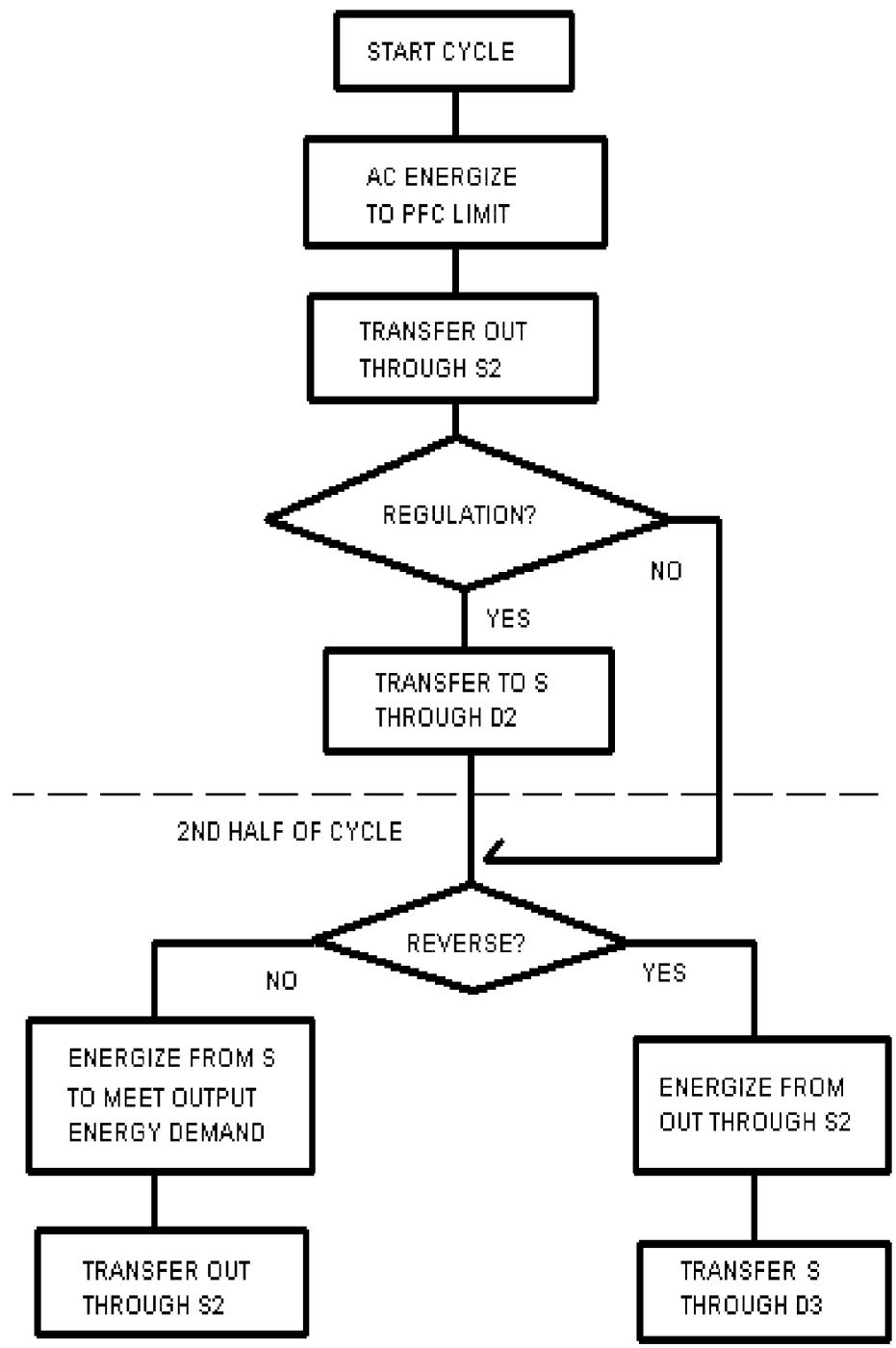
FIG. 21 shows a flow chart for control of the power converter of FIG. 20.

The operation above is shown in flowchart form in FIG. 21. That control can be implemented as a state machine, in programmable logic, in a microcontroller, or using discrete circuitry.

Figure 22:
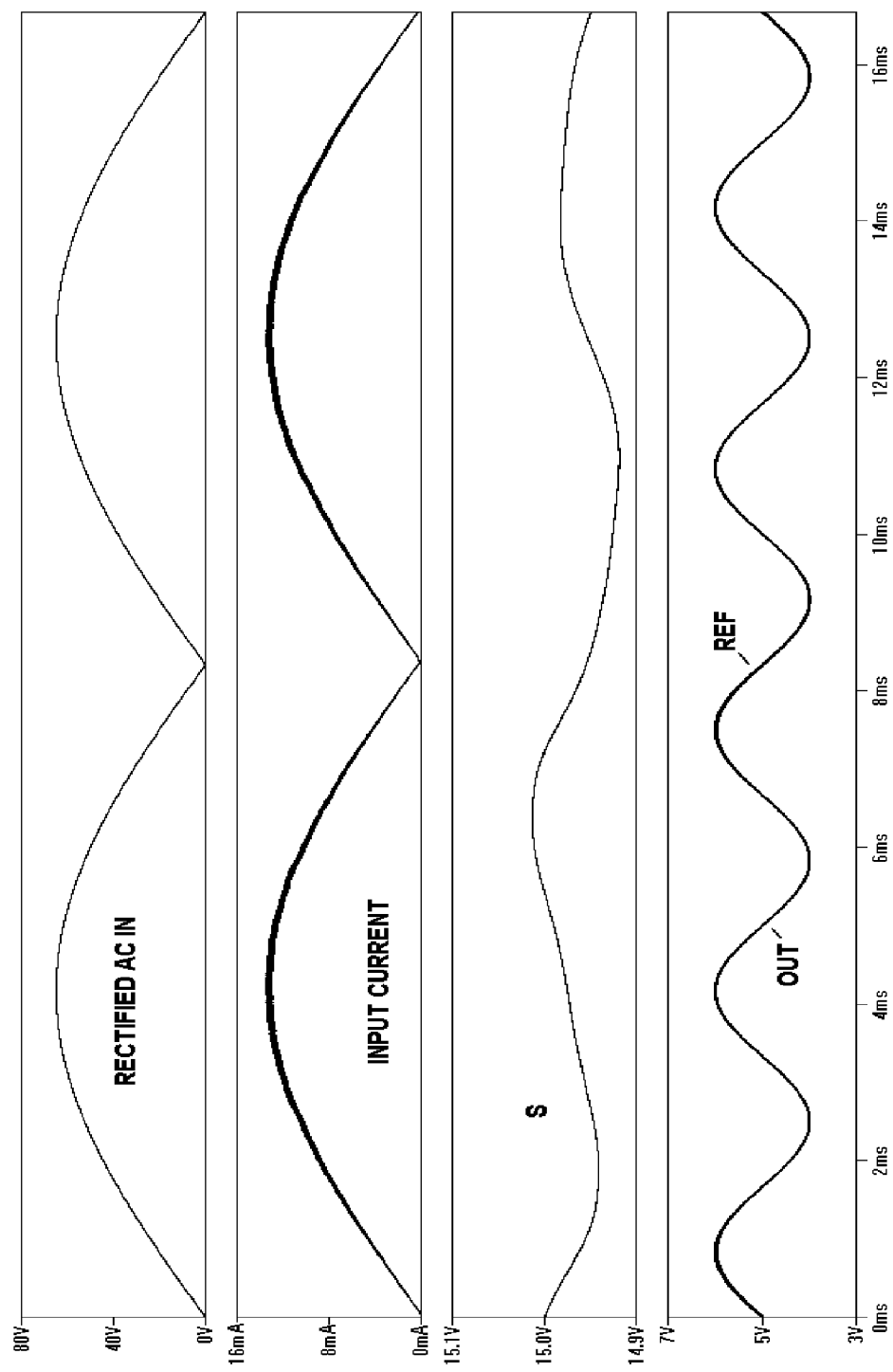
FIG. 22 shows simulated waveforms for the converter of FIG. 20 in operation.

FIG. 22 shows SPICE waveforms of the example of FIG. 20 in unipolar operation. The top trace shows one cycle of 60 Hz AC input voltage, AC IN. The second trace shows the rectified input current, INPUT CURRENT, low-pass filtered to remove most of the switching frequency. The filtered input current can be seen to be proportional to, and in phase with, the AC input voltage. The third trace shows the storage voltage, S. Voltage S is seen to increase and decrease, modulated at twice the frequency of the AC input voltage. The fourth axis shows the reference voltage, REF, here an offset sine wave at 300 Hz with an amplitude of 2 volts, and the output voltage, OUT. The bidirectional behavior can be seen as the power converter faithfully follows the reference voltage.

Figure 23:
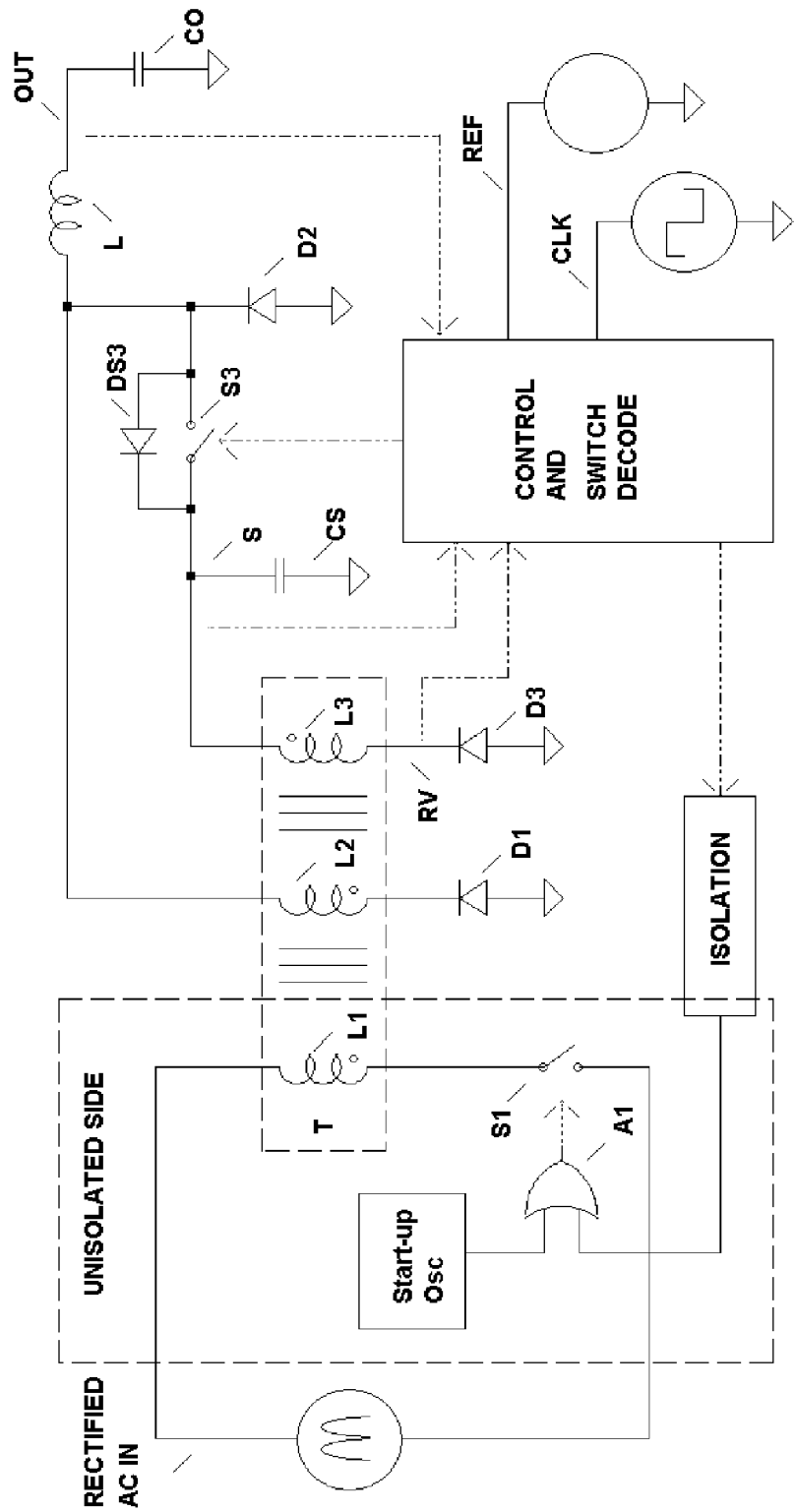
FIG. 23 shows a schematic block diagram of a single primary, dual secondary transformer in a topology with 2 switches, forming a unipolar, unidirectional power converter with PFC.

FIG. 23 shows a unipolar, unidirectional topology employing a dual secondary winding for transformer T, consisting of oppositely poled windings L2 and L3. This topology offers near-ideal PFC, good output regulation, excellent efficiency, low cost, and scalable power levels while employing just two switches. Both switches can be conventional FETs with body diodes, e.g., bipolar blocking is not necessary. The AC input, RECTIFIED AC IN, is rectified in this case. The unisolated side winding, L1, is driven by switch S1. The two secondary windings, L2 and L3, are oppositely poled. Winding L2 provides a forward energy path to the output, OUT, in combination with diode D1 and inductor L. Winding L3 provides a flyback path through diode D3 that moves inductive energy to the storage capacitor, CS. The combination of forward and flyback energy transfers enables higher power levels while preserving Power Factor Correction, and provides good regulation with excellent efficiency.

Diode D2 acts as the freewheeling diode for the buck inductor, L. Switch S3 provides a supplemental energy path from storage, CS, through the buck inductor, to the output, OUT, as filtered by filter capacitor CO. Diode DS3 is the body diode of switch S3, shown explicitly. The UNISOLATED SIDE is identical to that of FIGS. 1, 14, and 18 with the exception that the AC input node is RECTIFIED AC IN. An oscillator, Start-up Osc, turns on switch S1 at a low rate through OR gate A1 to energize storage capacitor CS, through transformer T. Energy is moved to CS through winding L3 and diode D3. Once the CONTROL AND SWITCH DECODE block is powered by voltage S, the CONTROL AND SWITCH DECODE block takes over the control of switch S1 via wireless communication through the isolation block, ISOLATION, and then via the second input to OR gate A1.

The CONTROL AND SWITCH DECODE block is paced by clock CLK. It uses a voltage reference, REF, for comparison when regulating the voltage or current at output OUT. The operation is similar to other implementations described here. Voltage RV provides a reflection of the AC input voltage for use in the calculation of the appropriate ON time. Energy is moved directly from input to output through the forward winding L2. A portion of the inductive energy will move directly to storage in CS via a flyback transfer through the flyback winding L3. Energy will also move to storage through the body diode of S3, DS3, when the voltage at L2 is higher than the storage voltage. The amount of energy that flows through DS3 to storage in CS is dependent on the input and storage voltages and on the transformer turns ratio. Adequate output regulation can be achieved by allowing the storage voltage S to center near that voltage which causes the output to rise only slightly during peaks in the input voltage. Because of the implicit output regulation, there is a tradeoff between output regulation and the percentage of converted energy which moves through the forward winding. Less energy moved through the forward winding, L2, allows better regulation.

Figure 24:
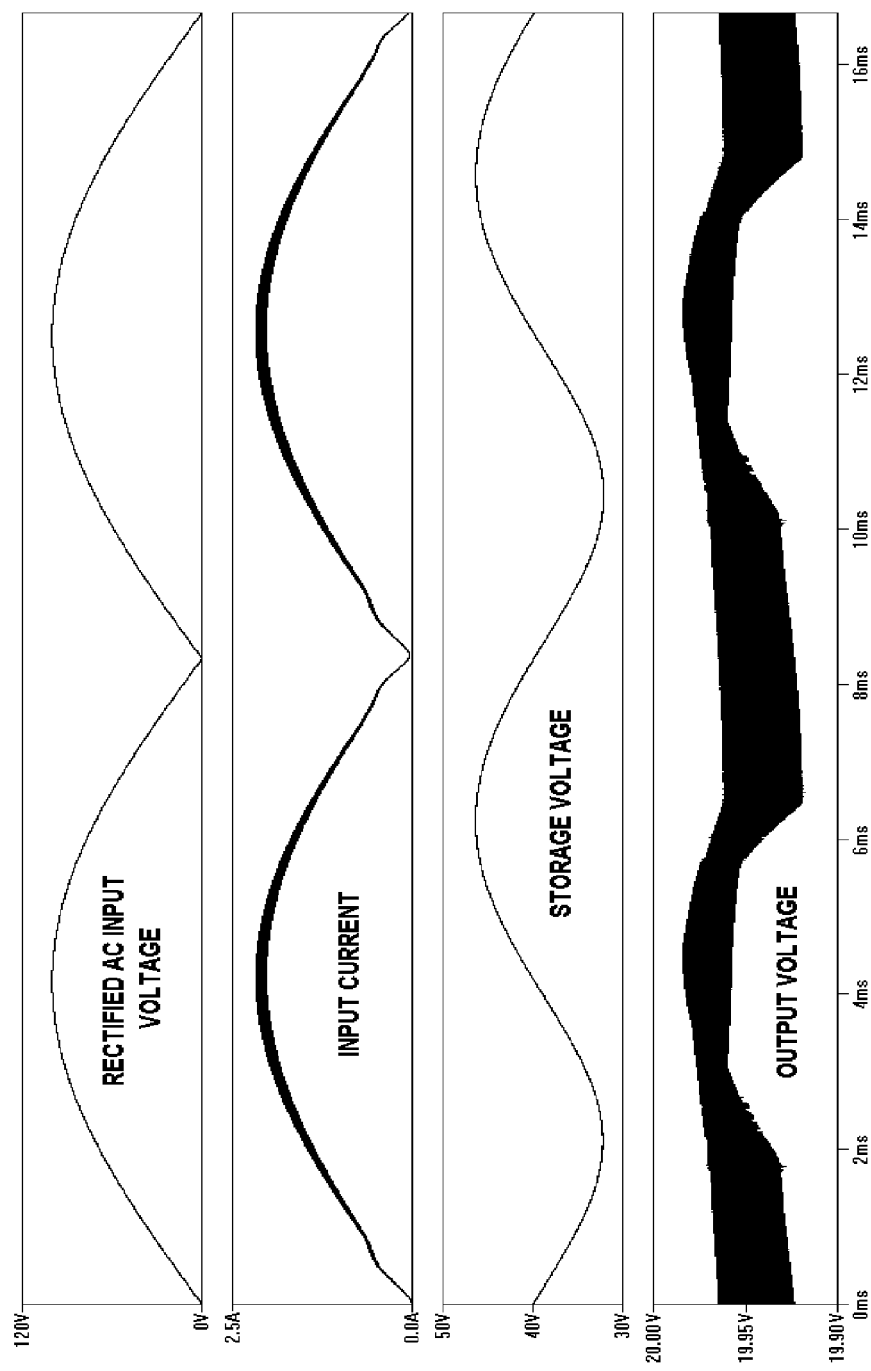
FIG. 24 shows simulated waveforms for the converter of FIG. 23 in operation.

Approximately half the power moves through each winding for the OUTPUT VOLTAGE waveform shown in FIG. 24, which is a SPICE simulation of the example of FIG. 23. The top trace shows one cycle of 60 Hz AC input voltage, RECTIFIED AC INPUT VOLTAGE. The second trace shows the input current, INPUT CURRENT. The input current can be seen to be proportional to, and in phase with, the AC input voltage. The third trace shows S, the STORAGE VOLTAGE. Voltage S is seen to increase and decrease, modulated at twice the frequency of the AC input voltage. The fourth axis shows the output, OUTPUT VOLTAGE. The slight reduction in the output during periods of lower AC input voltage is caused by the proportionally reduced reference voltage used by the supplemental power path. In many of these examples, it is desirable for the supplemental regulation to regulate to a voltage slightly below the regulation point of the main regulation. There does not have to be a separate reference. The reduced reference might be VREF*0.995. The supplemental power path need not supply energy to the output during peaks in the AC input. Peak energy from winding L2 can divide between (i) the body diode DS3 of S3 and (ii) inductor L. The body diode energy flows then into the storage capacitor CS, and the inductor energy flows to the output. This form of regulation is less than ideal. Even so, the entire voltage envelope for the nominal 20 volt output supply is seen here to be 70 mb. The slight distortion of the input current trace near zero volts input can be eliminated with an additional calculation.

Figure 25:
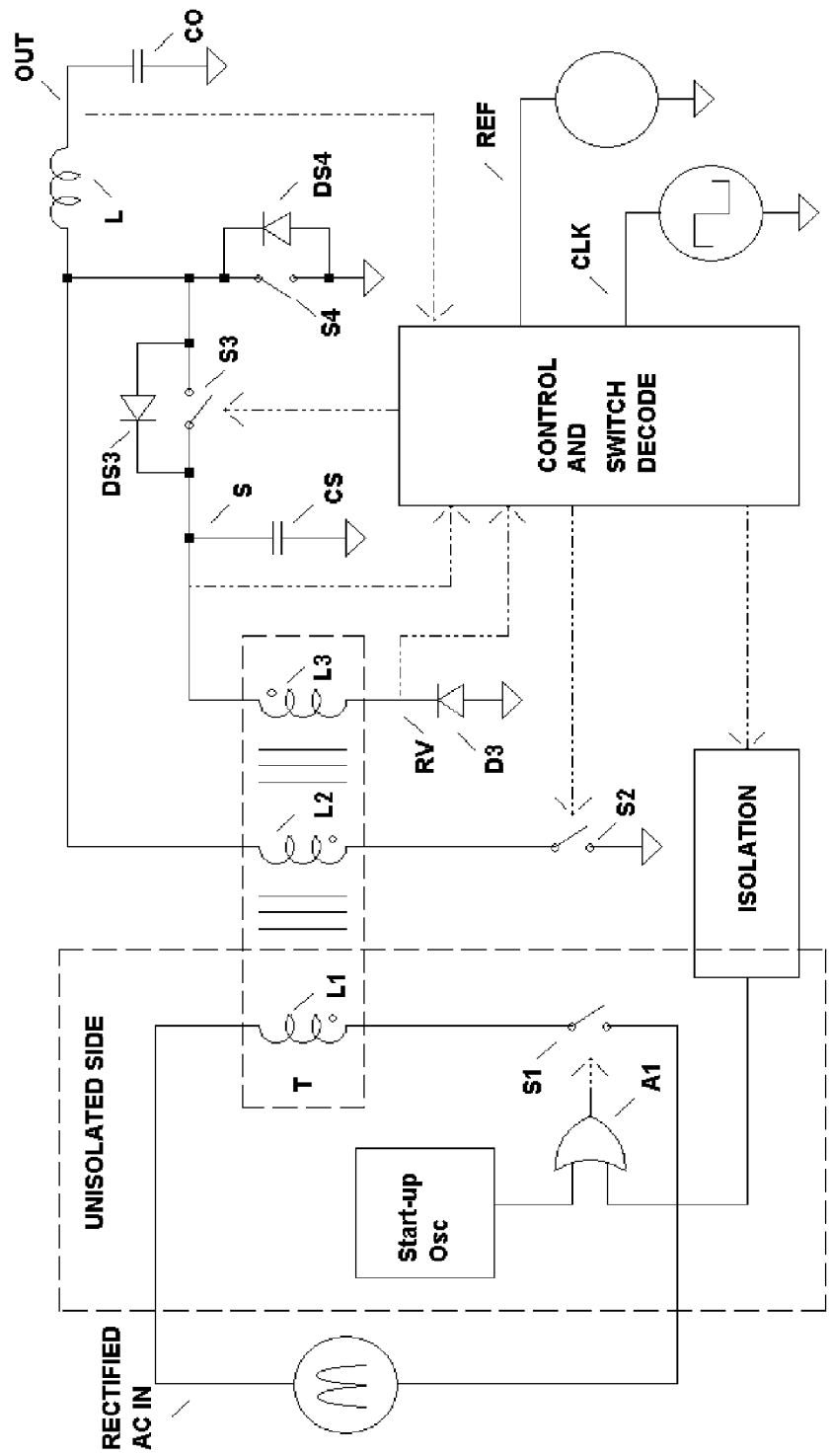
FIG. 25 shows a schematic block diagram of variations on the converter of FIG. 23 in block form.

Better regulation can be obtained using inductor L bidirectionality. FIG. 25 shows a variation on FIG. 23 with a synchronous rectifier switch, S4, in place of D2. The body diode of switch S4 is shown explicitly as DS4. Energy can be moved from the output, OUT, to inductor L by closing switch S4 at a time in the control cycle when no current is flowing in inductor L. Then, energy would flow from the output OUT into inductor L, until the regulation point was reached, at which time switch S4 opens. Then, the body diode of S3, shown explicitly as DS3, would be forward biased to transfer that inductive energy to the storage capacitor, CS. Switch S3 could be used to synchronously rectify that movement of energy into storage, for improved efficiency. With the ability to move energy from the output to storage, improved output regulation can be gained by correcting any voltage overshoot at the output. Also, a higher percentage of the total power can be routed through the forward winding, L2, without sacrificing regulation.

FIG. 25 includes one other variation that can be used in combination with, or instead of, bidirectional control for the supplemental converter. Using a bidirectionally blocking switch, S2, in place of diode D1, provides an alternative type of regulation. Any surplus energy in forward winding L2, e.g., energy not needed immediately to support the load, can selectively be moved directly to storage, CS, via a flyback transfer through the flyback winding L3, and diode D3, by opening switch S2. That mechanism reduces, or eliminates, the need for bidirectionality at the supplemental converter while maintaining excellent regulation. Since an efficient version of this topology would use synchronous rectification for D1 of FIG. 23, the only addition for better regulation would be to make that synchronous rectifier bipolar blocking. One effect of the use of a bidirectionally blocking switch S2 for regulation is that a larger percentage of the total power converted passes through the flyback winding. In cases where that is considered undesirable, FIG. 27 shows another alternative.

Figure 26:
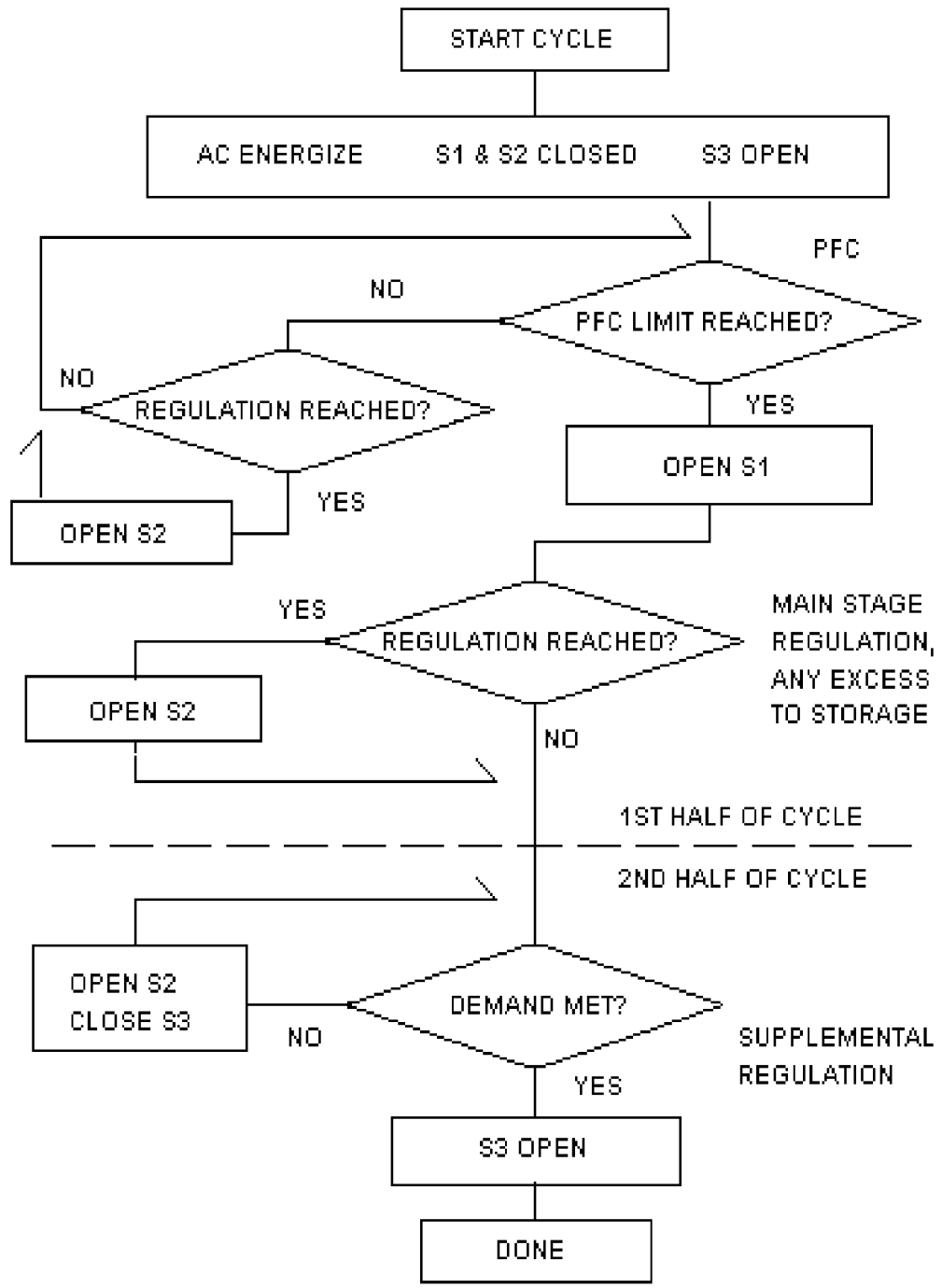
FIG. 26 shows a flow chart for control of the power converter of FIG. 25.

The operation for FIG. 25 is shown in flowchart form in FIG. 26. That control can be implemented as an integrated circuit, a state machine, in programmable logic, in a microcontroller, or using discrete circuitry. Elements of the first and second halves of the control cycle could be interchanged. The slow loop to control the storage voltage modulates the ON time for switch S1 over many AC input cycles to maintain good Power Factor Correction. The slow loop is not shown in the flowchart of FIG. 24.

Figure 27:
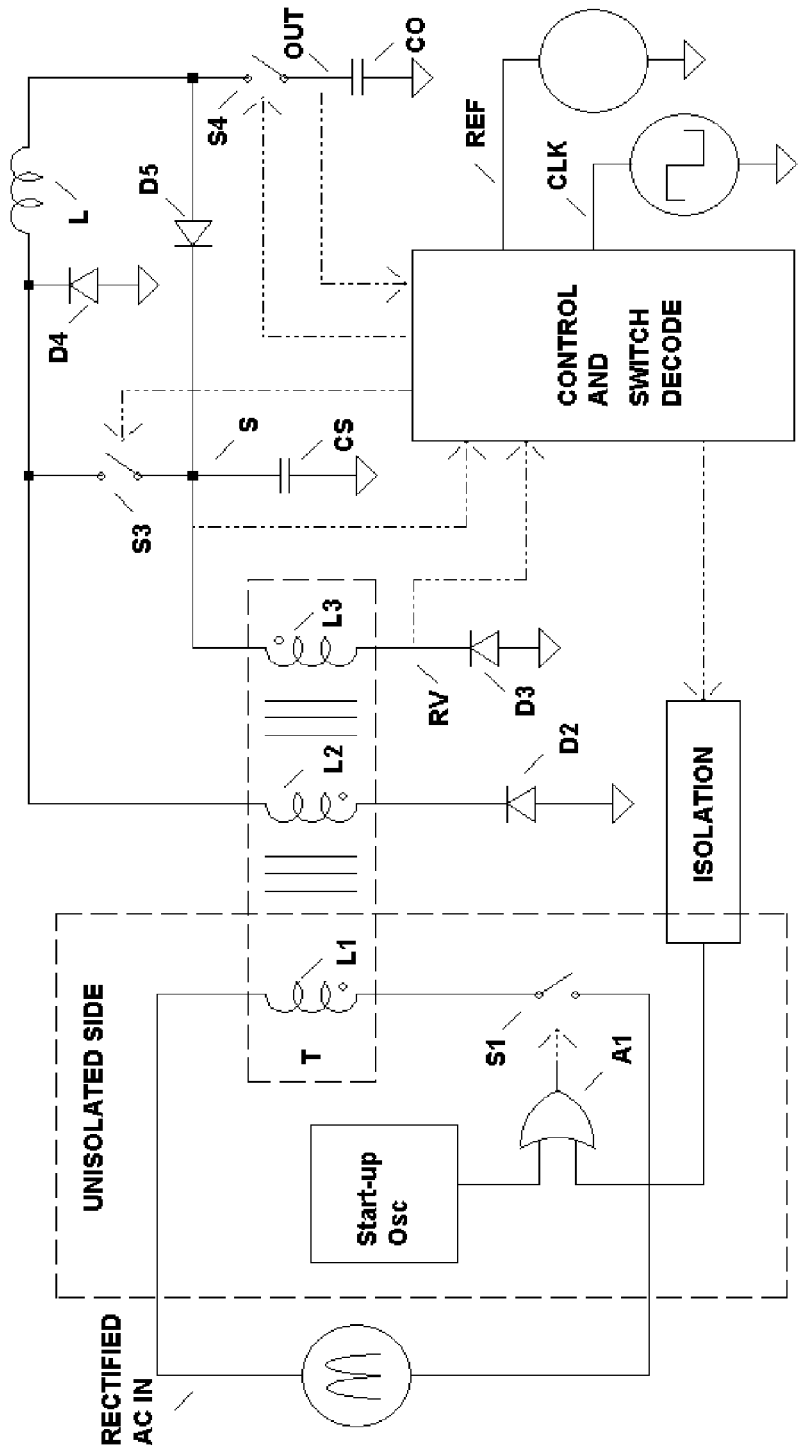
FIG. 27 shows a schematic block diagram of another variation on the converter of FIG. 23.

The circuit variation shown in FIG. 27 places a regulation switch, S4, between buck inductor L and the output, OUT, and places a diode, D5, from the junction of L and switch S4 to storage CS. Then, whenever the regulation switch S4 is opened, buck inductor energy flows through diode D5 to storage CS. That regulation approach allows minimizing the energy passing through the flyback winding L3. Otherwise, the structure and operation of FIG. 27 is the same as that of FIG. 23.

In FIGS. 23, 25, and 27, the energy moved during an ON time period of switch S1 is not solely dependent on the volt-time product at winding L1. Therefore, calculating circuitry is needed for near-ideal Power Factor Correction. Alternatively, the energizing power can be integrated and that integral can be compared to an amount of energy that is in proportion to the input voltage. The converters of FIGS. 23, 25, and 27 would use a non-critical control loop to slowly change the ON time in order to keep the storage voltage S within desired limits.

Again Predictive Energy Balancing is a valuable tool for improving regulation, but it is not required. The buck inductor L can have relatively low inductance, so that voltage overshoot at the output caused by energy flowing in the freewheeling diode D2 of FIG. 23, D4 of FIG. 27, or the synchronous rectifier S4 of FIG. 25, can be small, even when using simple comparators for control. Best efficiency occurs when the reference for the supplemental path is proportionally reduced to cause regulation at a slightly lower voltage than the main path. That technique causes the supplemental regulator to shut down entirely during peak periods at the AC input.

It is impractical to show all the possible variations on the converter of FIG. 23. One possibility is to place a single secondary winding in diode bridge to utilize inductive energy in both polarities. Many of the variations applied to other examples shown can also be applied here. For example, any of the diodes can be replaced by synchronous rectifiers, for improved efficiency.

The unisolated side could use the dual primary of FIGS. 4, 7, and 11 to eliminate the diode bridge, or a comparator on the unisolated side could be used to detect the AC polarity and select the appropriate switch. Additional outputs can be added and individually regulated. Those skilled in the art could make a bipolar version, or a bipolar bidirectional version. Quasi-resonant techniques can be applied for reducing switch losses. The clock frequency can adapt to match the load. The power converter of FIG. 23 can pass into and out of continuous conduction mode once each AC half cycle.

The power converters of FIGS. 1, 4, 7, 11, 14, 18, 20, 23, 25, and 27 and other embodiments of the invention that are not explicitly shown, including the power converters of FIGS. 12 and 13 of the '722 application, are switched-mode power converters that have at least one feature in common: they all have at least one multi-functional inductor on the output side of the power converter that supports both main regulation and supplemental regulation in a time-multiplexed manner within a single control cycle of the power converter, such that (i) during main regulation, input energy is transferred from the power converter's input node to the power converter's output node via the inductor and (ii) during supplemental regulation, stored energy is transferred from at least one energy storage element on the output side of the power converter to the output node via the inductor. In particular:

In FIGS. 1, 4, 7, and 11, the secondary winding L2 is such a multi-functional inductor;

In FIGS. 14, 18, and 20, the two secondary windings L2 and L3 are both examples of such multi-functional inductors; and In FIGS. 23, 25, and 27, the buck inductor L is such a multi-functional inductor.

In some embodiments, if, during main regulation, the output demand is satisfied and there is excess inductor energy in the multi-functional inductor, then the excess energy may be transferred to an energy storage device as part of main regulation.

In general and depending on the particular embodiment, a power converter of the invention can be configured to support some or all of the following operations:

Operation (1): Transfer of input energy from the input node to a multi-functional inductor;

Operation (2): Transfer of output energy from the output node to a multi-functional inductor;

Operation (3): Transfer of stored energy from an energy storage element to a multi-functional inductor;

Operation (4): Transfer of inductor energy from a multi-functional inductor to the output node; and Operation (5): Transfer of inductor energy from a multi-functional inductor to an energy storage element.

Depending on the particular embodiment, a power converter of the invention can be configured to perform some or all of those five operations in different sequences of operations during the course of a control cycle to handle a variety of different scenarios. For example, if, at the start of a control cycle, (i) the polarity of the input signal matches the polarity of the output demand and (ii) the output energy is deficient, and if the output demand is not satisfied during the main regulation, then the power converter of FIG. 1 can be configured to perform the following sequence of four steps during the control cycle:

Step 1: Operation (1): Transfer of input energy from the input node AC IN to the secondary winding L2 via primary winding L1 of transformer T (switch S1 closed; switches S2, S3, S4 open)—energize phase of first half of control cycle—part of main regulation;

Step 2: Operation (4): Transfer of inductor energy from winding L2 to the output node OUT via switch S3 (S3 closed; S1, S2, S4 open)—transfer phase of first half of control cycle—part of main regulation;

Step 3: Operation (3): Depending on polarity of output demand, transfer of stored energy to winding L2 either (i) from storage capacitor CP via switch S4 (S4 closed; S1, S2, S3 open) or (ii) from storage capacitor CN via switch S2 (S2 closed; S1, S3, S4 open)—energize phase of second half of control cycle—part of supplemental regulation; and Step 4: Operation (4): Transfer of inductor energy from winding L2 to output node OUT via switch S3 (S3 closed; S1, S2, S4 open)—transfer phase of second half of control cycle—part of supplemental regulation.

If instead, at the start of a control cycle, (i) the polarity of the input signal matches the polarity of the output demand and (ii) the output energy is deficient, but the output demand is satisfied during main regulation, then the power converter of FIG. 1 can be configured to perform the following sequence of three steps during the control cycle:

Step 1: Operation (1): Transfer of input energy from the input node AC IN to the secondary winding L2 via primary winding L1 (S1 closed; S2, S3, S4 open)—energize phase of first half of control cycle—part of main regulation;

Step 2: Operation (4): Transfer of inductor energy from winding L2 to the output node OUT via switch S3 (S3 closed; S1, S2, S4 open)—transfer phase of first half of control cycle—part of main regulation; and Step 3: Operation (5): Depending on polarity of inductor energy, transfer of excess inductor energy, if any, from winding L2 to either storage capacitor CP via switch S4 (S4 closed; S1, S2, S3 open) or storage capacitor CN via switch S2 (S2 closed; S1, S3, S4 open)—storage transfer phase of first half of control cycle—part of main regulation.

If, at the start of a control cycle, the polarity of the input signal does not match the polarity of the output demand, then the power converter of FIG. 1 can be configured to perform the following sequence of four steps during the control cycle:

Step 1: Operation (1): Transfer of input energy from the input node AC IN to the secondary winding L2 via primary winding L1 (S1 closed; S2, S3, S4 open)—energize phase of first half of control cycle—part of main regulation;

Step 2: Operation (5): Depending on polarity of input energy, transfer of inductor energy from winding L2 to either storage capacitor CP via switch S4 (S4 closed; S1, S2, S3 open) or storage capacitor CN via switch S2

(S2 closed; S1, S3, S4 open)—transfer phase of first half of control cycle—part of neither main nor supplemental regulation;

Step 3: Operation (3): Depending on polarity of output demand, transfer of stored energy to winding L2 either (i) from storage capacitor CP via switch S4 (S4 closed; S1, S2, S3 open) or (ii) from storage capacitor CN via switch S2 (S2 closed; S1, S3, S4 open)—energize phase of second half of control cycle—part of supplemental regulation; and Step 4: Operation (4): Transfer of inductor energy from winding L2 to the output node OUT via switch S3 (S3 closed; S1, S2, S4 open)—transfer phase of second half of control cycle—part of supplemental regulation.

If, at the start of a control cycle, there is excess energy at the output node OUT, then the power converter of FIG. 1 can be configured to perform the following sequence of four steps during the control cycle:

Step 1: Operation (2): Transfer of excess output energy from the output node OUT to the secondary winding L2 via switch S3 (S3 closed; S1, S2, S4 open)—energize phase of first half of control cycle—part of main regulation;

Step 2: Operation (5): Depending on polarity of inductor energy, transfer of inductor energy from winding L2 to either storage capacitor CP via switch S4 (S4 closed; S1, S2, S3 open) or storage capacitor CN via switch S2 (S2 closed; S1, S3, S4 open)—transfer phase of first half of control cycle—part of main regulation;

Step 3: Operation (1): Transfer of input energy from the input node AC IN to the secondary winding L2 via primary winding L1 (S1 closed; S2, S3, S4 open)—energize phase of second half of control cycle—part of PFC regulation; and Step 4: Operation (5): Depending on polarity of inductor energy, transfer of inductor energy from winding L2 to either storage capacitor CP via switch S4 (S4 closed; S1, S2, S3 open) or storage capacitor CN via switch S2 (S2 closed; S1, S3, S4 open)—transfer phase of second half of control cycle—part of PFC regulation.

Given the teachings of this specification, those skilled in the art will understand how some or all of the five different operations listed above can be sequenced to perform main and/or supplemental regulation for each of the other power converter embodiments of the invention. Because Operation (1) can admit AC input current in proportion to AC input voltage, power converter embodiments of the invention are able to perform near-ideal PFC. Operation (5) will complete through diode D4 or D2 without turning on S4 or S2, but at slightly reduced efficiency.

All the examples shown employ a 200 kHz clock, and all waveforms are shown while driving representative resistive loads. All are capable of running at other clock frequencies and with other input frequencies or voltages, and serving various loads. Most can run from DC input voltages, where constant (or limited rate of change) input current can be an advantage. All unipolar examples, with minor modifications evident to those skilled in the art, can operate in the opposite polarity. With large storage reservoirs, these topologies can serve as Uninterruptible Power Supplies (UPSs) with the capacitors providing hold-over energy. Synchronous rectification can be added to many of these topologies. All can use a volt-time product for terminating energize periods instead of current sensing. Given synchronous rectification capabilities for terminating energy transfers, current sense resistors can be eliminated. Many of these topologies can make good use of bipolar blocking GaN switches.

Although the invention has been described in the context of embodiments in which capacitors are used as energy storage elements, in other embodiments, other types of energy storage elements may be used such as (without limitation) batteries and super-capacitors.

Other variations of these examples will be evident to those skilled in the art. Those variations include, but are not limited to, regulating current instead of voltage at an output, adding additional output ports, using series diodes to avoid the need for bipolar blocking switches, and removing the ISOLATION block for applications where isolation is not required.

Different topologies show different optimization for flexibility, simplicity, efficiency, size, and cost. Predictive Energy Balancing can improve the regulation of many of these topologies, but is not necessary.

What is claimed is:

1. A power converter for converting AC input power into regulated output power, the power converter comprising:
an input side connected to receive the AC input power at an input node of the power converter; and
an output side connected to produce the regulated output power at an output node of the power converter, wherein:
the power converter has a transformer comprising at least one primary winding on the input side and at least one secondary winding on the output side;
the output side further comprises at least one energy storage element;
the power converter is configurable to perform main regulation in which input energy is transferred from the input node to the output node via the transformer;
the power converter is configurable to perform supplemental regulation in which stored energy is transferred from the at least one energy storage element to the output node; and
the power converter comprises a multi-functional inductor that supports both the main regulation and the supplemental regulation in a time-multiplexed manner such that:
during the main regulation, the input energy is transferred from the input node to the output node via the multi-functional inductor;
during the main regulation, if excess energy exists in the multi-functional inductor after an output demand has been satisfied, then the excess energy is transferred from the multi-functional inductor to the at least one energy storage element; and
during the supplemental regulation, the stored energy is transferred from the at least one energy storage element to the output node via the multi-functional inductor.

2. The power converter of claim 1, wherein:
during the main regulation, the power converter uses forward power transfers; and
the power converter can transfer energy via either forward or flyback transfers.

3. The power converter of claim 1, wherein the power converter adjusts the total amount of energy admitted at the input node to actively manage the stored energy in the at least one energy storage element.

4. The power converter of claim 1, wherein the power converter is a switched-mode power converter that performs both the main regulation and the supplemental regulation within a single control cycle of the power converter.

5. The power converter of claim 1, wherein the power converter regulates both (i) input current and (ii) output voltage or current within a single control cycle of the power converter by actively managing the at least one energy storage element.

6. The power converter of claim 1, wherein the power converter draws input current in proportion to and in phase with input voltage to achieve Power Factor Correction (PFC).

7. The power converter of claim 1, wherein:
the multi-functional inductor is a secondary winding of the transformer;
during the main regulation, the input energy is transferred from the input node to the secondary winding via the at least one primary winding and then from the secondary winding to the output node; and
during the supplemental regulation, the stored energy is transferred from the at least one energy storage element to the secondary winding and then from the secondary winding to the output node.

8. The power converter of claim 7, wherein:
the power converter is a bidirectional power converter; and
if excess energy exists at the output node, then the excess energy is transferred from the output node into the secondary winding and from the secondary winding to the at least one energy storage element.

9. The power converter of claim 7, wherein:
the transformer comprises a single primary winding and a single secondary winding; and
the output side comprises a positive energy storage element configurable to store stored energy having a positive polarity and a negative energy storage element configurable to store stored energy having a negative polarity.

10. The power converter of claim 7, wherein the transformer comprises a positive-polarity primary winding, a negative-polarity primary winding, and a single secondary winding.

11. The power converter of claim 7, wherein the transformer comprises a single primary winding, a positive-polarity secondary winding, and a negative-polarity secondary winding.

12. The power converter of claim 1, wherein:
the multi-functional inductor is a buck inductor the output side;
during the main regulation, the input energy is transferred from the input node to the output node via the buck inductor; and
during the supplemental regulation, the stored energy is transferred from the at least one energy storage element to the output node via the buck inductor.

13. The power converter of claim 12, wherein:
during the main regulation, the power converter uses forward power transfers; and
the power converter can transfer energy to the at least one energy storage element via either forward or flyback transfers.

14. The power converter of claim 12, wherein:
the power converter is a bidirectional power converter; and
if excess energy exists at the output node, then the excess energy is transferred from the output node to the at least one energy storage element via the buck inductor.

15. The power converter of claim 1, further comprising a controller configured to control at least one switch on the input side and at least one switch on the output side to implement the main regulation and the supplemental regulation in the time-multiplexed manner.

16. The power converter of claim 1, wherein:
during the main regulation, the power converter uses forward power transfers;
the power converter can transfer energy via either forward or flyback transfers;
the power converter adjusts the total amount of energy admitted at the input node to actively manage the stored energy in the at least one energy storage element;
the power converter is a switched-mode power converter that performs both the main regulation and the supplemental regulation within a single control cycle of the power converter;
the power converter regulates both (i) input current and (ii) output voltage or current within a single control cycle of the power converter by actively managing the at least one energy storage element; and
the power converter draws input current in proportion to and in phase with input voltage to achieve Power Factor Correction (PFC).

17. A method for converting AC input power into regulated output power, the method comprising:
(a) performing main regulation in which input energy is transferred from an input node a power converter to an output node of the power converter via a transformer of the power converter, wherein the transformer comprises at least one primary winding on an input side of the power converter and at least one secondary winding on an output side of the power converter; and
(b) performing supplemental regulation in which stored energy is transferred from at least one energy storage element on the output side of the power converter to the output node, wherein:
the power converter comprises a multi-functional inductor that supports of the main regulation and the supplemental regulation in a time-multiplexed manner such that:
during the main regulation, the input energy is transferred from the input node to the output node via the multi-functional inductor;
during the main regulation, if excess energy exists in the multi-functional inductor after an output demand has been satisfied, then the excess energy is transferred from the multi-functional inductor to the at least one energy storage element; and
during the supplemental regulation, the stored energy is transferred from the at least one energy storage element to the output node via the multi-functional inductor.

18. The method of claim 17, wherein:
during the main regulation, the power converter uses forward power transfers; and
the power converter transfers energy via either forward or flyback transfers.

19. The method of claim 17, wherein the power converter adjusts the total amount of energy admitted at the input node to actively manage the stored energy in the at least one energy storage element.

20. The method of claim 17, wherein the power converter is a switched-mode power converter that performs both the main regulation and the supplemental regulation within a single control cycle of the power converter.

21. The method of claim 17, wherein the power converter regulates both (i) input current and (ii) output voltage or current within a single control cycle of the power converter by actively managing the at least one energy storage element.

22. The method of claim 17, wherein the power converter draws input current in proportion to and in phase with input voltage to achieve Power Factor Correction (PFC).

23. The method of claim 17, wherein:
during the main regulation, the power converter uses forward power transfers;
the power converter transfers energy via either forward or flyback transfers;
the power converter adjusts the total amount of energy admitted at the input node to actively manage the stored energy in the at least one energy storage element;
the power converter is a switched-mode power converter that performs both the main regulation and the supplemental regulation within a single control cycle of the power converter;
the power converter regulates both (i) input current and (ii) output voltage or current within a single control cycle of the power converter by actively managing the at least one energy storage element; and
the power converter draws input current in proportion to and in phase with input voltage to achieve Power Factor Correction (PFC).

24. A power converter for converting AC input power into regulated output power, the power converter comprising:
an input side connected to receive the AC input power at an input node of the power converter; and
an output side connected to produce the regulated output power at an output node of the power converter, wherein:
the power converter has a transformer comprising at least one primary winding on the input side and at least one secondary winding on the output side;
the output side further comprises at least one energy storage element;
the power converter is configurable to perform main regulation in which input energy is transferred from the input node to the output node via the transformer;
the power converter is configurable to perform supplemental regulation in which stored energy is transferred from the at least one energy storage element to the output node; and
a secondary winding of the transformer is a multi-functional inductor that supports both the main regulation and the supplemental regulation in a time-multiplexed manner such that:
during the main regulation, the input energy is transferred from the input node to the secondary winding via the at least one primary winding and then from the secondary winding to the output node; and
during the supplemental regulation, the stored energy is transferred from the at least one energy storage element to the secondary winding and then from the secondary winding to the output node.

25. The power converter of claim 24, wherein, during the main regulation, if excess energy exists in the secondary winding after an output demand has been satisfied, then the excess energy is transferred from the secondary winding to the at least one energy storage element.

26. The power converter of claim 24, wherein:
the power converter is a bidirectional power converter; and
if excess energy exists at the output node, then the excess energy is transferred from the output node into the secondary winding and from the secondary winding to the at least one energy storage element.

27. The power converter of claim 24, wherein:
the transformer comprises a single primary winding and a single secondary winding; and
the output side comprises a positive energy storage element configurable to store stored energy having a positive polarity and a negative energy storage element configurable to store stored energy having a negative polarity.

28. The power converter of claim 24, wherein the transformer comprises a positive-polarity primary winding, a negative-polarity primary winding, and a single secondary winding.

29. The power converter of claim 24, wherein the transformer comprises a single primary winding, a positive-polarity secondary winding, and a negative-polarity secondary winding.

30. A method for converting AC input power into regulated output power, the method comprising:
(a) performing main regulation in which input energy is transferred from an input node of a power converter to an output node of the power converter via a transformer of the power converter, wherein the transformer comprises at least one primary winding on an input side of the power converter and at least one secondary winding on an output side of the power converter; and
(b) performing supplemental regulation in which stored energy is transferred from at least one energy storage element on the output side of the power converter to the output node, wherein:
a secondary winding of the transformer is a multi-functional inductor that supports both the main regulation and the supplemental regulation in a time-multiplexed manner such that:
during the main regulation, the input energy is transferred from the input node to the secondary winding via the at least one primary winding and then from the secondary winding to the output node; and
during the supplemental regulation, the stored energy is transferred from the at least one energy storage element to the secondary winding and then from the secondary winding to the output node.

31. The method of claim 30, wherein, during the main regulation, if excess energy exists in the secondary winding after an output demand has been satisfied, then the excess energy is transferred from the secondary winding to the at least one energy storage element.

32. The method of claim 30, wherein:
the power converter is a bidirectional power converter; and
if excess energy exists at the output node, then the excess energy is transferred from the output node into the secondary winding and from the secondary winding to the at least one energy storage element.

33. The method of claim 30, wherein:
the transformer comprises a single primary winding and a single secondary winding; and
the output side comprises a positive energy storage element configurable to store stored energy having a positive polarity and a negative energy storage element configurable to store stored energy having a negative polarity.

34. The method of claim 30, wherein the transformer comprises a positive-polarity primary winding, a negative-polarity primary winding, and a single secondary winding.

35. The method of claim 30, wherein the transformer comprises a single primary winding, a positive-polarity secondary winding, and a negative-polarity secondary winding.

* * * * *